US009560645B2

(12) United States Patent
Susitaival et al.

(10) Patent No.: US 9,560,645 B2
(45) Date of Patent: Jan. 31, 2017

(54) UE, A SECONDARY ENB AND A MASTER ENB AND RESPECTIVE METHOD PERFORMED THEREBY FOR PROVIDING SYSTEM INFORMATION OF A COMMUNICATION SYSTEM TO THE UE

(71) Applicant: Telefonaktiebolaget L M Ericsson (publ), Stockholm (SE)

(72) Inventors: Riikka Susitaival, Helsinki (FI); Daniel Larsson, Vallentuna (SE); Stefan Wager, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/432,220

(22) PCT Filed: Jan. 30, 2015

(86) PCT No.: PCT/SE2015/050107
§ 371 (c)(1),
(2) Date: Mar. 30, 2015

(87) PCT Pub. No.: WO2015/115992
PCT Pub. Date: Aug. 6, 2015

(65) Prior Publication Data
US 2015/0358945 A1    Dec. 10, 2015

Related U.S. Application Data

(60) Provisional application No. 61/934,523, filed on Jan. 31, 2014.

(51) Int. Cl.
*H04W 72/04* (2009.01)
*H04W 48/16* (2009.01)
(Continued)

(52) U.S. Cl.
CPC ........... *H04W 72/042* (2013.01); *H04W 48/16* (2013.01); *H04W 56/004* (2013.01); *H04W 72/0446* (2013.01); *H04W 84/045* (2013.01)

(58) Field of Classification Search
None
See application file for complete search history.

(56) References Cited

U.S. PATENT DOCUMENTS

2010/0197308 A1* 8/2010 Racz ................. H04W 36/0072
455/436
2011/0280223 A1* 11/2011 Maeda ................. H04W 72/082
370/335

(Continued)

FOREIGN PATENT DOCUMENTS

WO    2013151404 A1    10/2013

OTHER PUBLICATIONS

Unknown, Author, "Provisioning of the SeNB system information", 3GPP TSG-RAN WG2 #84, R2-133887, ETRI, San Francisco, California, USA, Nov. 11-15, 2013, 1-3.

(Continued)

*Primary Examiner* — Benjamin Lamont
(74) *Attorney, Agent, or Firm* — Murphy, Bilak & Homiller, PLLC

(57) ABSTRACT

A UE, a MeNB, a SeNB and respective methods performed thereby are provided. The UE, the MeNB, and the SeNB are operable in a wireless communication system, the wireless communication system being adapted to provide for dual connectivity between the SeNB and a UE, and between the UE and a MeNB. The method is performed for providing system information of the wireless communication system to the UE and for the UE to acquire the system information. The method performed by the UE comprises receiving (110), from the SeNB, a MIB of a cell of the SeNB; and (Continued)

acquiring (120) a System Frame Number, SFN, from the MIB.

6 Claims, 20 Drawing Sheets

(51) Int. Cl.
    *H04W 84/04* (2009.01)
    *H04W 56/00* (2009.01)

(56) References Cited

U.S. PATENT DOCUMENTS

| | | | | |
|---|---|---|---|---|
| 2012/0113843 A1* | 5/2012 | Watfa | H04W 72/1289 | 370/252 |
| 2013/0079049 A1* | 3/2013 | Yu | H04W 48/16 | 455/524 |
| 2013/0095835 A1* | 4/2013 | Carmon | H04W 36/0083 | 455/437 |
| 2013/0163569 A1* | 6/2013 | Lee | H04L 1/0045 | 370/336 |
| 2014/0161100 A1* | 6/2014 | Velde | H04W 36/0072 | 370/331 |
| 2015/0079981 A1* | 3/2015 | Zhu | H04W 48/16 | 455/434 |
| 2015/0215825 A1* | 7/2015 | Kim | H04W 36/0088 | 370/331 |
| 2015/0215912 A1* | 7/2015 | Jha | H04W 76/048 | 370/311 |
| 2015/0358975 A1* | 12/2015 | Yang | H04J 11/005 | 370/336 |

OTHER PUBLICATIONS

Unknown, Author, "SFN handling for Small cells", 3GPP TSG RAN WG2 #84, R2-134015, Samsung, San Francisco, California, USA, Nov. 11-15, 2013, 1-2.

Unknown, Author, "Signalling procedures for dual connectivity", 3GPP TSG-RAN WG2 #84, Tdoc R2-134219, Ericsson, San Francisco, California USA, Nov. 11-15, 2013, 1-9.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300 V12.3.0, Sep. 2014, 1-215.

Unknown, Author, "A common user plane architecture for dual connectivity", 3GPP TSG-RAN WG2 #84, R2-134224, Ericsson, San Francisco, California, USA, Nov. 11-15, 2013, 1-4.

Unknown, Author, "Comparison of intra-bearer UP architectures", 3GPP TSG-RAN WG2 Meeting #83bis, R2-133603, Ericsson, Ljubljana, Slovenia, Oct. 7-11, 2013, 1-8.

Unknown, Author, "CP and UP separation", 3GPP TSG-RAN WG2 Meeting #83bis, R2-133425, Ericsson, Ljubljana, Slovenia, Oct. 7-11, 2013, 1-3.

Unknown, Author, "Heterogeneous Network Deployment Scenarios", Ericsson, ST-Ericsson, 3GPP TSG-RAN WG1 #70bis, R1-124513, San Diego, CA, USA, Oct. 8-12, 2012, 1-3.

Unknown, Author, "Initial considerations on Heterogeneous Networks for UMTS", Ericsson, ST-Ericsson, 3GPP TSG RAN WG1 Meeting #70bis, R1-124512, San Diego, CA, USA, Oct. 8-12, 2012, 1-7.

Unknown, Author, "L2 transport of SRBs and relation to RLF handling", 3GPP TSG-RAN WG2 #84, R2-134221, Ericsson, San Francisco, California, USA, Oct. 11-15, 2013, 1-5.

Unknown, Author, "Proposed SID: Study on UMTS Heterogeneous Networks", Huawei, HiSilicon, TSG RAN Meeting #57, RP-121436, Chicago, USA, Sep. 4-7, 2012, 1-5.

Unknown, Author, "Way forward with control plane architecture selection", 3GPP TSG-RAN WG2 #83, R2-132700, Ericsson, ST-Ericsson, Barcelona, Spain, Aug. 19-23, 2013, 1-5.

* cited by examiner

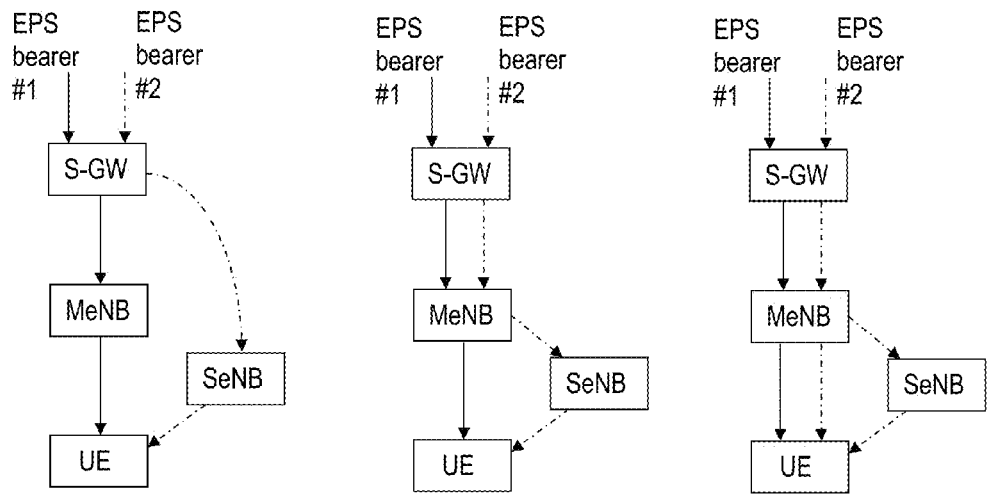
Fig. 29
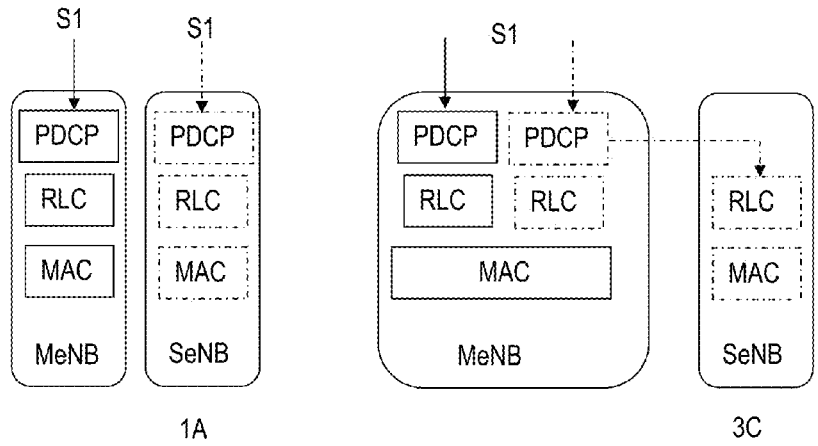
Fig. 30
Fig. 31

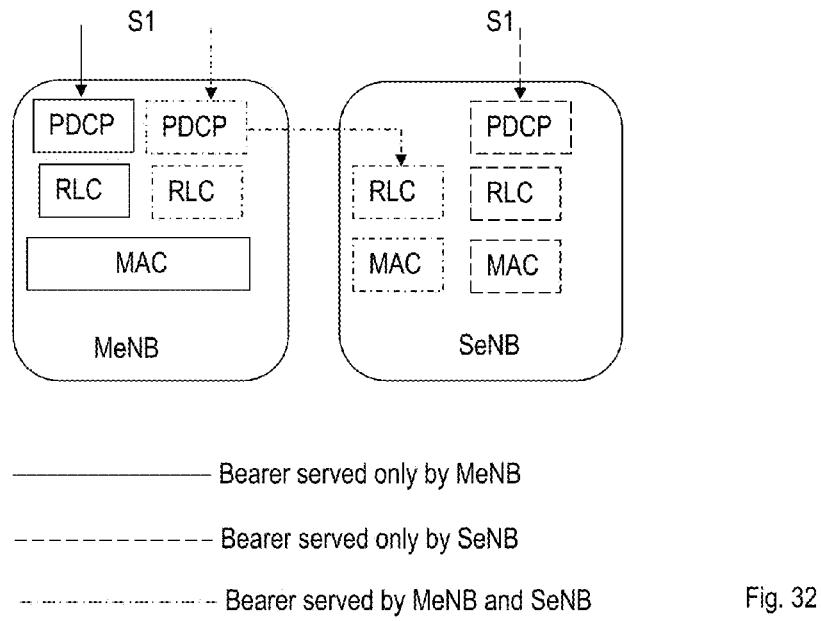
Fig. 32
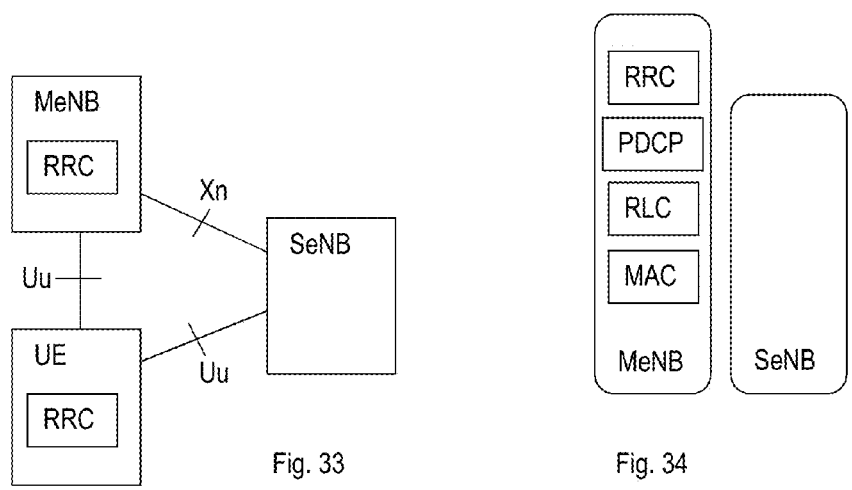
Fig. 33
Fig. 34

UE, A SECONDARY ENB AND A MASTER ENB AND RESPECTIVE METHOD PERFORMED THEREBY FOR PROVIDING SYSTEM INFORMATION OF A COMMUNICATION SYSTEM TO THE UE

TECHNICAL FIELD

The present disclosure relates to wireless communication and in particular to arrangements and methods for a User Equipment, UE, to acquire system information of the wireless communication system and for a Master evolved NodeB, MeNB, and a Secondary evolved NodeB, SeNB to provide system information of the wireless communication system to the UE.

BACKGROUND

In a typical cellular radio system, wireless terminals (also referred to as user equipment unit nodes, UEs, mobile terminals, and/or mobile stations) communicate via a radio access network, RAN, with one or more core networks, which provide access to data networks, such as the Internet, and/or the public-switched telecommunications network, PSTN. The RAN covers a geographical area that is divided into cell areas, with each cell area being served by a radio base station (also referred to as a base station, a RAN node, a "NodeB", and/or enhanced NodeB "eNodeB" or "eNB"). A cell area is a geographical area where radio coverage is provided by the base station equipment at a base station site. The base stations communicate through radio communication channels with wireless terminals within range of the base stations.

Cellular communications system operators have begun offering mobile broadband data services based on, for example, Wideband Code Division Multiple Access, WCDMA, High Speed Packet Access, HSPA, and Long Term Evolution, LTE, wireless technologies. Moreover, fuelled by introduction of new devices designed for data applications, end user performance requirements are steadily increasing. The increased adoption of mobile broadband has resulted in significant growth in traffic handled by high-speed wireless data networks. Accordingly, techniques that allow cellular operators to manage networks more efficiently are desired.

Techniques to improve downlink performance may include 4-branch MIMO, multi-flow communication, multi carrier deployment, etc. Since spectral efficiencies per link may be approaching theoretical limits, next steps may include improving spectral efficiencies per unit area. Further efficiencies for wireless networks may be achieved, for example, by changing a topology of traditional networks to provide increased uniformity of user experiences throughout a cell. Currently, so-called heterogeneous networks are being developed for 3GPP as discussed, for example, in: RP-121436, Study on UMTS Heterogeneous Networks, TSG RAN Meeting #57, Chicago, USA, 4-7 Sep. 2012; R1-124512, Initial considerations on Heterogeneous Networks for UMTS, Ericsson, ST-Ericsson, 3GOO TSG RAN WG1 Meeting #70bis, San Diego, Calif., USA, 8-12 Oct. 2012; and R1-124513, Heterogeneous Network Deployment Scenarios, Ericsson, ST-Ericsson, 3GPP TSG-RAN WG1 #70bis, San Diego, Calif., USA, 8-12 Oct. 2012.

A homogeneous network is a network of base stations (also referred to as NodeB's, enhanced NodeB's, or eNBs) in a planned layout, providing communications services for a collection of user terminals (also referred to as user equipment nodes, UEs, and/or wireless terminals) in which all base stations may have similar transmit power levels, antenna patterns, receiver noise floors, and/or backhaul connectivity to the data network. Moreover, all base stations in a homogeneous network may offer unrestricted access to user terminals in the network, and each base station may serve roughly a same number of user terminals. Current cellular wireless communications systems in this category may include, for example, Global System for Mobile communication, GSM, WCDMA, High Speed Downlink Packet Access, HSDPA, LTE, Worldwide Interoperability for Microwave Access, WiMAX, etc.

In a heterogeneous network, low power base stations (also referred to as low power nodes, LPNs, micro nodes, pico nodes, femto nodes, relay nodes, remote radio unit nodes, RRU nodes, small cells, RRUs, etc.) may be deployed along with or as an overlay to planned and/or regularly placed macro base stations. A macro base station, MBS, may thus provide service over a relatively large macro cell area and each LPN may provide service for a respective relatively small LPN cell area within the relatively large macro cell area. Power transmitted by an LPN (e.g. 2 Watts) may be relatively small compared to power transmitted by a macro base station (e.g. 40 Watts for a typical macro base station). An LPN may be deployed, for example, to reduce/eliminate a coverage hole(s) in the coverage provided by the macro base stations, and/or to off-load traffic from macro base stations (e.g., to increase capacity in a high traffic location, also referred to as a hot-spot). Due to the lower transmit power and smaller physical size, an LPN may offer greater flexibility for site acquisition.

In initial discussions among members of the $3^{rd}$ Generation Partnership Project, 3GPP, regarding the development of Release 12 specifications for LTE, one of the proposed items for study is the possibility of simultaneously serving a User Equipment (UE) from more than one eNB. In the disclosure that follows, this is called "dual connectivity."

There is a need for a procedure between a Master eNB, MeNB, and a Second eNB, SeNB, to agree on UE radio resource configuration. For instance, a procedure is needed to enable the setup, the modification or the handover of a UE bearer for which radio resources are provided by a radio network node (SeNB) that is different from the radio network node (MeNB) that hosts the RRC connection and the connection to the core network.

The MeNB and SeNB roles are defined from a UE point of view. This means that an eNB that acts as a MeNB to one UE may act as SeNB to another UE.

SUMMARY

The object is to obviate at least some of the problems outlined above. In particular, it is an object to provide a UE, a MeNB and a SeNB and respective method performed thereby for the UE to acquire system information of the wireless communication system and for the MeNB and the SeNB to provide system information of the wireless communication system. These objects and others may be obtained by providing a UE, a MeNB and a SeNB and a respective method performed by the UE, the MeNB and the SeNB respectively according to the independent claims attached below.

According to an aspect, a method performed by a UE is provided, the UE being operable in a wireless communication system, the wireless communication system being adapted to provide for dual connectivity between the UE and a MeNB, and between the UE and a SeNB, the method being performed for acquiring system information of the wireless communication system. The method comprises receiving, from the SeNB, a Master Information Block, MIB, of a cell of the SeNB; and acquiring a System Frame Number, SFN, from the MIB.

According to an aspect, a method performed by a UE is provided, the UE being operable in a wireless communication system, the wireless communication system being adapted to provide for dual connectivity between the UE and a MeNB, and between the UE and a SeNB, the method being performed for acquiring system information of the wireless communication system. The method comprises receiving, from the MeNB, a SFN of the MeNB from the MIB; and receiving, from the MeNB, an SFN offset relating to the offset between the SFN of the SeNB and the SFN of the MeNB by means of dedicated RRC signalling.

According to an aspect, a method performed by a MeNB is provided, the MeNB being operable in a wireless communication system, the wireless communication system being adapted to provide for dual connectivity between the MeNB, and a UE, and between the UE and a Secondary eNB, SeNB, the method being performed for providing system information of the wireless communication system to the UE. The method comprises determining a System Frame Number, SFN, offset with regard to the MeNB and the SeNB; and transmitting the SFN offset to the UE by means of dedicated RRC signalling.

According to an aspect, a method performed by a SeNB is provided, the SeNB being operable in a wireless communication system, the wireless communication system being adapted to provide for dual connectivity between the SeNB and a UE, and between the UE and a MeNB, the method being performed for providing system information of the wireless communication system to the UE. The method comprises determining a SFN offset with regard to the MeNB and the SeNB; and transmitting the SFN offset to the MeNB by means of S1 or X2 signalling.

According to an aspect, UE is provided, the UE being operable in a wireless communication system, the wireless communication system being adapted to provide for dual connectivity between the UE and a MeNB, and between the UE and a SeNB, the UE being configured for acquiring system information of the wireless communication system. The UE is configured for receiving, from the SeNB, a MIB of a cell of the SeNB; and acquiring a System Frame Number, SFN, from the MIB.

According to an aspect, UE is provided, the UE being operable in a wireless communication system, the wireless communication system being adapted to provide for dual connectivity between the UE and a MeNB, and between the UE and a SeNB, the UE being configured for acquiring system information of the wireless communication system. The UE is configured for receiving, from the MeNB, a SFN of the MeNB from the MIB; and receiving, from the MeNB, an SFN offset relating to the offset between the SFN of the SeNB and the SFN of the MeNB by means of dedicated RRC signalling.

According to an aspect, a MeNB is provided, the MeNB being operable in a wireless communication system, the wireless communication system being adapted to provide for dual connectivity between the MeNB, and a UE, and between the UE and a Secondary eNB, SeNB, the MeNB being configured for providing system information of the wireless communication system to the UE. The MeNB is configured for determining a SFN offset with regard to the MeNB and the SeNB; and transmitting the SFN offset to the UE by means of dedicated RRC signalling.

According to an aspect, a SeNB is provided, the SeNB being operable in a wireless communication system, the wireless communication system being adapted to provide for dual connectivity between the SeNB and a UE, and between the UE and a MeNB, the SeNB being configured for providing system information of the wireless communication system to the UE. The SeNB is configured for determining a SFN offset with regard to the MeNB and the SeNB; and transmitting the SFN offset to the MeNB by means of S1 or X2 signalling.

The UE, the MeNB, the SeNB, and the respective methods performed thereby may have several possible advantages. One possible advantage is that when the SFN is signalled to the UE, there is no need to align SFNs among different eNBs, the MeNB and the SeNB. Another possible advantage is that the UE gets accurate timing information when SFNs are not aligned between eNBs, the MeNB and the SeNB. Still a possible advantage is that the UE does not need to monitor MIB of the SeNB and SeNB does not need to broadcast it which may save radio resources.

BRIEF DESCRIPTION OF DRAWINGS

Embodiments will now be described in more detail in relation to the accompanying drawings, in which:

FIG. 29 illustrates three options for splitting the U-Plane data.

FIG. 30 illustrates an example of user plane protocol termination for bearer split option 1.

FIG. 31 illustrates an example of a user plane protocol architecture for bearer split option 3.

FIG. 32 illustrates an example of combined user plane architecture for 1A and 3C.

FIG. 33 illustrates an example of Radio Interface C-plane architecture for dual connectivity.

FIG. 34 illustrates an example of, signalling radio bearers, SRB only transported via MeNB.

DETAILED DESCRIPTION

Briefly described, a UE and a method performed thereby for acquiring system information of the wireless communication system are provided. Further, a MeNB and a SeNB and a respective method performed thereby for providing system information of the wireless communication system to the UE are provided. The three entities cooperate in order to acquire and provide comprehensive system information. One part of system information that the UE needs to acquire and the MeNB and the SeNB need to provide is System Frame Number, SFN. The MeNB and the SeNB may not be synchronised with regards to the SFN, e.g. in a TTI the SFN of the MeNB may be 3 and the SFN of the SeNB may be 8. Thus, the UE needs to obtain both the SFN of the MeNB and the SeNB.

Figure 1:
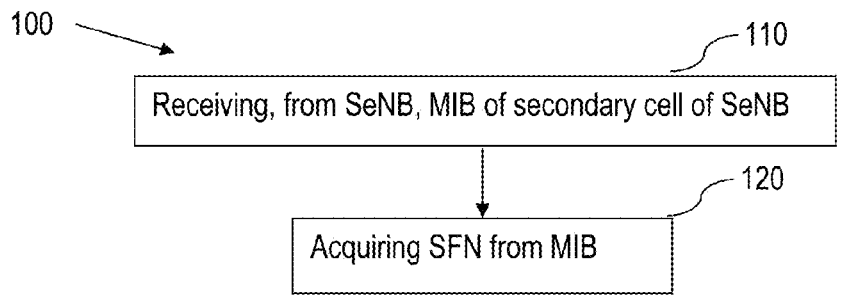
FIG. 1 is a flowchart of a method performed by a UE for acquiring system information of the wireless communication system according to an exemplifying embodiment.

Embodiments herein relate to a method performed by a UE operable in a wireless communication system, the wireless communication system being adapted to provide for dual connectivity between the UE and a MeNB, and between the UE and a SeNB, the method being performed for acquiring system information of the wireless communication system. FIG. 1 illustrates the method 100 comprising receiving 110, from the SeNB, a MIB of a cell of the SeNB; and acquiring 120 a System Frame Number, SFN, from the MIB.

The MeNB and the SeNB may transmit system information, or parts of it, in different manners. One example is by broadcasting MIB. The MIB comprises a limited number of most essential and most frequently transmitted parameters that are needed to acquire other information from the cell of the SeNB. The MIB may be transmitted on a Broadcasting Channel, BCH, while other system information messages may be transmitted on e.g. a Downlink Shared Channel, DL-SCH. As the MIB comprises important information, it is transmitted frequently with a fixed scheduling. The MIB uses a periodicity of 40 ms and repetitions made within 40 ms. The MIB contains downlink bandwidth of the cell of the MeNB, Physical Hybrid-ARQ Indicator Channel, PHICH, configuration and the SFN.

The requirements how often SFN need to be updated may be different as compared to the normal MIB acquisition. The network increases SFN every 10 millisecond until the SFN wrap-around. So once the UE has acquired the SFN, it does not need to update that except if there are specific reasons.

One reason why the UE may need to re-read MIB is the potential drift in the UE's and the SeNB's clock. Then SFN may get unsynchronised. However, this drift may be estimated by the UE from other channels as Primary Synchronisation Signal, PSS, and Secondary Synchronisation Signal, SSS, synchronisation channels. Those are transmitted by the MeNB and the SeNB every 5 ms. If there is a drift in those channels, then also the drift of SFN may be estimated.

The network may configure how often the UE needs to update SFN from the broadcasted channel.

The UE thus receives the MIB from the SeNB with regard to the cell of the SeNB, and then acquires the SFN from the MIB of the cell of the MeNB.

The method performed by the UE may have several possible advantages. One possible advantage is that when the SFN is signalled to the UE, there is no need to align SFNs among different eNBs, the MeNB and the SeNB.

Another possible advantage is that the UE gets accurate timing information when SFNs are not aligned between eNBs, the MeNB and the SeNB.

The method 100 may further comprise receiving other system Information by means of dedicated Radio Resource Control, RRC, signalling from the MeNB.

Not all system information is sent by means of the MIB. The UE may further receive other system Information by means of dedicated RRC signalling from the MeNB. The system information that is sent by means of dedicated RRC may be changed more frequently or less frequently than the system information that is sent by means of the MIB. Thus, the system information that is sent by means of dedicated RRC signalling may be sent when needed, e.g. if some system information has been updated.

For example, in case the MeNB is serving the UE in downlink and the SeNB is serving the UE in uplink, then also system information pertaining to the SeNB should be signalled via the MeNB by means of RRC signalling. Also system information pertaining to the MeNB should be signalled via the MeNB by means of RRC signalling.

Figure 2A:
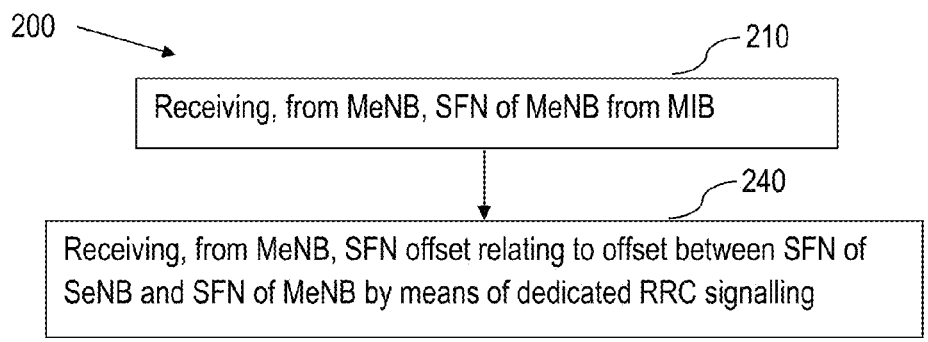
FIG. 2a is a flowchart of a method performed by a UE for acquiring system information of the wireless communication system according to yet an exemplifying embodiment.

Embodiments herein relate to a method performed by a UE operable in a wireless communication system, the wireless communication system being adapted to provide for dual connectivity between the UE and a MeNB, and between the UE and a SeNB, the method being performed for acquiring system information of the wireless communication system. FIG. 2a illustrates the method 200 comprising receiving 210, from the MeNB, a SFN of the MeNB from the MIB; and receiving 240, from the MeNB, an SFN offset relating to the offset between the SFN of the SeNB and the SFN of the MeNB by means of dedicated Radio Resource Control, RRC, signalling.

The UE receives the MIB which is transmitted by the MeNB as described above. From the MIB, the UE reads and thus acquires the SFN of the MeNB. The UE may be served by the MeNB, at least in downlink, by means of a primary cell of the MeNB.

The UE also receives the SFN offset from the MeNB. The SFN offset informs the UE of the offset, or difference, between the SFN of the MeNB and the SFN of the SeNB. The SFN offset generally is an integer between e.g. 0 and 10.

This means that the UE does not need to receive the MIB from the SeNB in order to acquire the SFN of the SeNB as the UE receives the SFN of the MeNB and the difference in SFN between the MeNB and the SeNB by means of the SFN offset.

The method performed by the UE may have several possible advantages. One possible advantage is that when the SFN is signalled to the UE, there is no need to align SFNs among different eNBs, the MeNB and the SeNB. Another possible advantage is that the UE does not need to monitor MIB of the SeNB and SeNB does not need to broadcast it which may save radio resources.

Figure 2B:
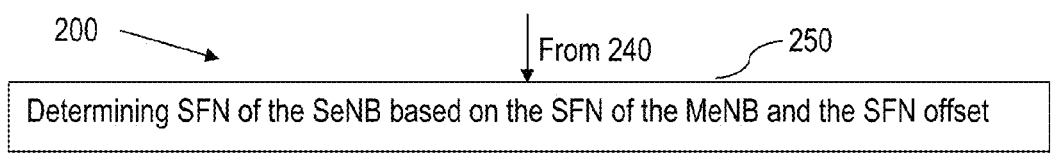
FIG. 2b is a flowchart of a method performed by a UE for acquiring system information of the wireless communication system according to another exemplifying embodiment.

The method 200 may further comprise, as illustrated in FIG. 2b, determining 250 the SFN of the SeNB based on the SFN of the MeNB and the SFN offset.

Once the UE has the SFN of the MeNB it may determine the SFN of the SeNB by adding the SFN offset to the SFN of the MeNB.

In this manner, the UE need not receive system information from the SeNB in order to determine the SFN of the SeNB.

Figure 2C:
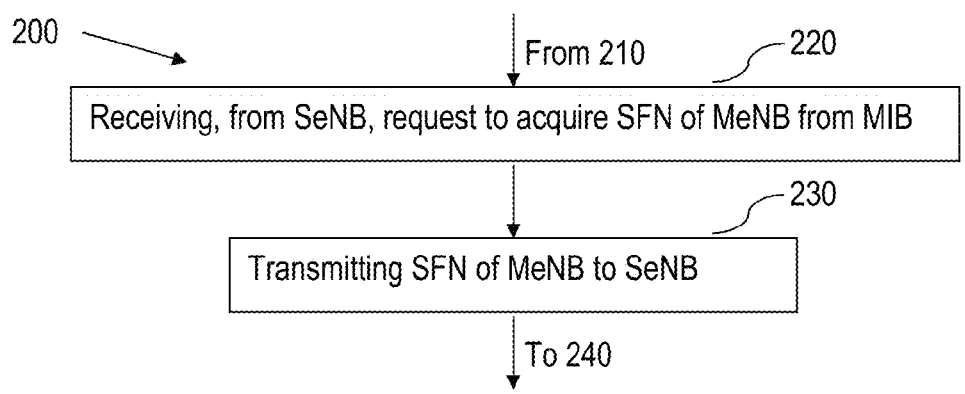
FIG. 2c is a flowchart of a method performed by a UE for acquiring system information of the wireless communication system according to still an exemplifying embodiment.

The method 200 may further comprise, as illustrated in FIG. 2c, receiving 220, from the SeNB, a request to acquire the SFN of the MeNB from the MIB; and transmitting 230 the SFN of the MeNB to the SeNB.

The MeNB and the SeNB may coordinate in order to find out what is the SFN offset, or difference, between them.

In case the SeNB does not have the information of the SFN of the MeNB, the SeNB may request the SFN of the MeNB from the UE. Since the UE has received the SFN of the MeNB by means of the MIB, the UE may simply respond to the SeNB and transmit the SFN of the MeNB to the SeNB in order for the SeNB to determine the SFN offset.

In an example, a starting time of radio frames in the MeNB is denoted t1 and a starting time of radio frames in the SeNB is denoted t2, wherein t2>t1, a frame_offset is defined as t2−t1, wherein when (a) a time difference between a current moment, t, and the next radio frame boundary of the SeNB is bigger than the frame_offset, then the SFN of the SeNB is defined as the SFN of the MeNB+the SFN offset; and (b) the time difference between a current moment, t, and the next radio frame boundary of the SeNB is smaller than the frame_offset, then the SFN of the SeNB is defined as the SFN of the MeNB+the SFN offset−1.

Looking at FIG. 3S as an example, cases 2 and 3 illustrate a situation where the starting times of radio frames in the MeNB and the SeNB are not synchronised, meaning that t1≠t2 and in these examples t2>t1.

Both Cases 2 and 4 illustrate a situation (a) where in the beginning of the subframe, the time difference between a current moment, t, and the next radio frame boundary of the SeNB is bigger than the frame_offset (1.0 ms and 1.5 ms for case 2 and 3 respectively). This occurs in subframes 0, 1, 2, 3, 4, 5, 6, 7, 8 in both cases. The SFN offset is 5 and when SFN of the MeNB is 1, the SFN of the SeNB is 5 plus the SFN of the MeNB, i.e. the SFN of the SeNB is 6.

Both Cases 2 and 4 illustrate also a situation (b) where in the beginning of the subframe, the time difference between a current moment, t, and the next radio frame boundary of the SeNB is smaller than the frame_offset. This occurs in subframe 9 in both cases. The SFN offset is 5 and SFN of the MeNB is 2, the SFN of the SeNB is 5 plus the SFN of the MeNB, minus 1. i.e. the SFN of the SeNB is 6.

Figure 3:
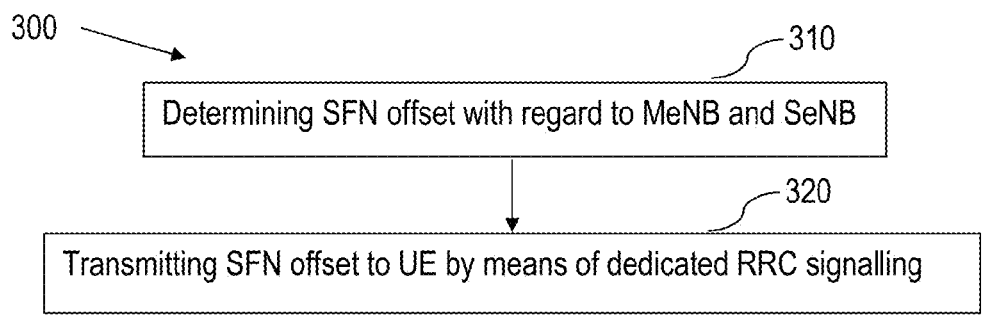
FIG. 3 is a flowchart of a method performed by a MeNB for providing system information of the wireless communication system to a UE according to an exemplifying embodiment.

Embodiments herein relate to a method performed by a MeNB operable in a wireless communication system, the wireless communication system being adapted to provide for dual connectivity between the MeNB, and a User Equipment, UE, and between the UE and a SeNB, the method being performed for providing system information of the wireless communication system to the UE. FIG. 3 illustrates the method 300 comprising determining 310 a System Frame Number, SFN, offset with regard to the MeNB and the SeNB; and transmitting (320) the SFN offset to the UE by means of dedicated Radio Resource Control, RRC, signalling.

The MeNB may determine the SFN offset with regard to the MeNB and the SeNB in different ways as will be described in more detail below.

Once the MeNB has determined the SFN offset, the MeNB transmits the SFN offset to the UE. This is done by means of RRC signalling. The UE is in this manner enabled to determine the SFN of the SeNB based on the SFN offset and on the SFN of the MeNB, which may be transmitted to the UE by means of broadcasting the MIB.

The method performed by the MeNB may have several possible advantages. One possible advantage is that when the SFN is signalled to the UE, there is no need to align SFNs among different eNBs, the MeNB and the SeNB. Another possible advantage is that the UE gets accurate timing information when SFNs are not aligned between eNBs, the MeNB and the SeNB. Still a possible advantage is that the UE does not need to monitor MIB of the SeNB and SeNB does not need to broadcast it which may save radio resources.

In an example, determining 310 the SFN offset comprises receiving the SFN offset from the SeNB by means of X2 signalling.

There may be different ways for the MeNB to determine the SFN offset. In this example, the SFN offset is determined by the SeNB and transmitted to the MeNB, thus the MeNB determines the SFN offset by receiving it from the SeNB by means of X2 signalling.

The method 300 may further comprise determining SFN offset based on the received SFN offset from the SeNB and based on a time reference such as Global Positioning System, GPS, time.

As described above, the MeNB and the SeNB may coordinate to determine the SFN offset, or difference, between them. The difference may be obtained by signalling over X2 or by reading the broadcasted information directly. In the X2 signalling approach, if the backhaul delay is not known, the SFN offset may be obtained by utilising some other time reference, such as GPS time. Alternatively, SeNB may read the broadcast channel of the MeNB and obtain the MIB, including MeNB's SFN (or vice versa). Another alternative approach is that the MeNB determines accuracy of the offset from a central network node, which signals the offset over S1 or X2. The offset may be a similar to an offset that is used to perform synchronisation over the air between different cells on the SeNB frequency layer.

Still further, the method 300 may comprise determining SFN offset comprises reading broadcast information received from the SeNB.

This, is another alternative of how the SeNB and MeNB may coordinate in order to obtain the SFN offset. The MeNB may read the broadcast channel of the SeNB and obtain the SIB of the SeNB, including SeNB's SFN (or vice versa).

As described above, both the MeNB and the SeNB may broadcast their own MIB comprising system information relating to the MeNB and the SeNB respectively.

Figure 4:
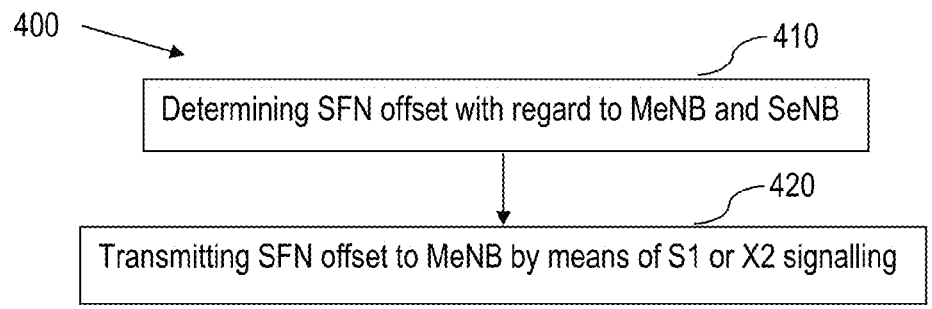
FIG. 4 is a flowchart of a method performed by a SeNB for providing system information of the wireless communication system to a UE according to an exemplifying embodiment.

Embodiments herein relate to a method performed by a SeNB, operable in a wireless communication system, the wireless communication system being adapted to provide for dual connectivity between the SeNB, and a User Equipment, UE, and between the UE and a MeNB, the method being performed for providing system information of the wireless communication system to the UE. FIG. 4 illustrates the method comprising determining 410 a System Frame Number, SFN, offset with regard to the MeNB and the SeNB; and transmitting 420 the SFN offset to the MeNB by means of S1 or X2 signalling.

The SeNB may be responsible for determining the SFN offset and the SeNB may determine the SFN offset in different ways as has been explained above.

Once the SeNB has determined the SFN offset, the SeNB may transmit the SFN offset to the MeNB. The MeNB and the SeNB may communicate by means of X2 signalling, or via an S1 protocol, wherein they communicate via e.g. a Radio Network Controller, RNC.

The method performed by the SeNB may have several possible advantages. One possible advantage is that when the SFN is signalled to the UE, there is no need to align SFNs among different eNBs, the MeNB and the SeNB. Another possible advantage is that the UE gets accurate timing information when SFNs are not aligned between eNBs, the MeNB and the SeNB. Still a possible advantage is that the UE does not need to monitor MIB of the SeNB and SeNB does not need to broadcast it which may save radio resources.

In an example, determining 410 SFN offset comprises reading a broadcast channel of the MeNB, obtaining a MIB of the MeNB comprising the SFN of the MeNB and determining the SFN offset based on the SFN of the SeNB and the SFN of the MeNB.

This has been explained above in relation to the method performed by the UE and the method performed by the UE.

In another example, determining 410 SFN offset comprises requesting the SFN of the MeNB from the UE, receiving the SFN of the MeNB from the UE, and determining the SFN offset based on the SFN of the SeNB and the SFN of the MeNB.

As described above, the UE has received the SFN of the MeNB by means of the MIB, the UE may simply respond to the SeNB and transmit the SFN of the MeNB to the SeNB in order for the SeNB to determine the SFN offset. Therefore, one way for the SeNB to obtain the SFN of the MeNB is to request it from the UE.

Embodiments herein also relate to a UE operable in a wireless communication system, the wireless communication system being adapted to provide for dual connectivity between the UE and a MeNB, and between the UE and a SeNB, the UE being configured for acquiring system information of the wireless communication system.

Embodiments of such a UE will now be described with reference to FIGS. 5 and 2, which are block diagrams of embodiments of such a UE. The UE has the same technical features, objects and advantages as the method performed by the UE. The UE will only be described in brief in order to avoid unnecessary repetition.

Figure 5:
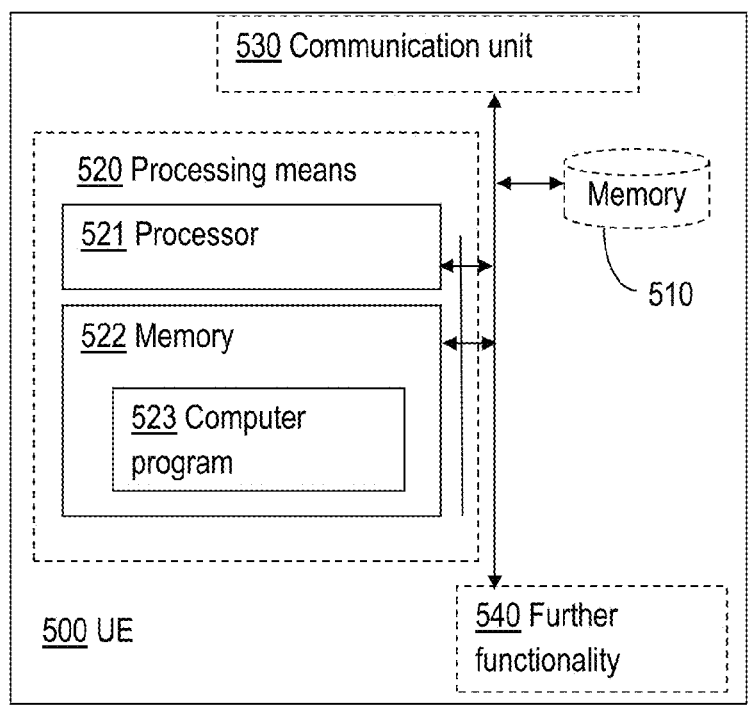
FIG. 5 is a block diagram of a UE for acquiring system information of the wireless communication system according to an exemplifying embodiment.
Figure 6:
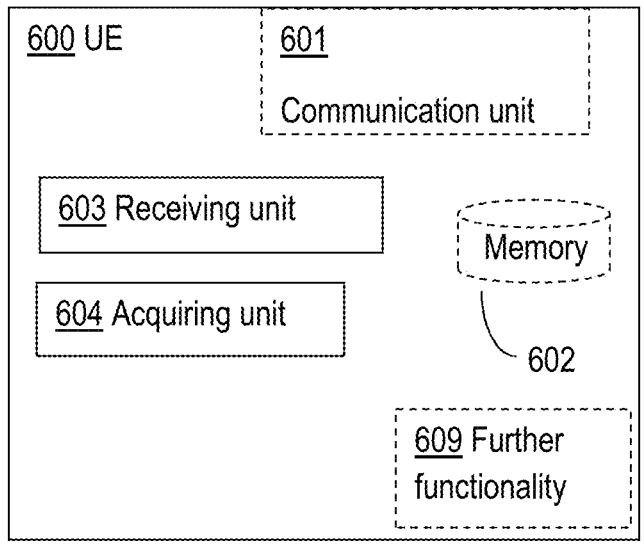
FIG. 6 is a block diagram of a UE for acquiring system information of the wireless communication system according to yet an exemplifying embodiment.

FIGS. 5 and 6 illustrate the UE 500, 600 being configured for receiving, from the SeNB, a MIB of a cell of the SeNB; and acquiring a SFN from the MIB.

The UE 500, 600 may be realised or implemented in various different ways. A first exemplifying implementation is illustrated in FIG. 5. FIG. 5 illustrate the UE 500 comprising a processor 521 and memory 522, the memory comprising instructions, e.g. by means of a computer program 523, which when executed by the processor 521 causes the UE 500 to receive, from the SeNB, a MIB of a cell of the SeNB; and to acquire a System Frame Number, SFN, from the MIB.

FIG. 5 also illustrates the UE 500 comprising a memory 510. It shall be pointed out that FIG. 5 is merely an exemplifying illustration and memory 510 may be optional, be a part of the memory 522 or be a further memory of the UE. The memory may for example comprise information relating to the UE 500, to statistics of operation of the UE 500, just to give a couple of illustrating examples. FIG. 5 further illustrates the UE 500 comprising processing means 520, which comprises the memory 522 and the processor 521. Still further, FIG. 5 illustrates the UE 500 comprising a communication unit 530. The communication unit 530 may comprise an interface through which the UE 500 communicates with other nodes or entities of the communication network. FIG. 5 also illustrates the UE 500 comprising further functionality 540. The further functionality 540 may comprise hardware of software necessary for the UE 500 to perform different tasks that are not disclosed herein.

An alternative exemplifying implementation of the UE 500, 600 is illustrated in FIG. 6. FIG. 6 illustrates the UE 600 comprising a receiving unit 603 for receiving, from the SeNB, a MIB of a cell of the SeNB. The UE 600 further comprises an acquiring unit 604 for acquiring a SFN from the MIB.

In FIG. 6, the UE 600 is also illustrated comprising a communication unit 601. Through this unit, the UE 600 is adapted to communicate with other nodes and/or entities in the wireless communication network. The communication unit 601 may comprise more than one receiving arrangement. For example, the communication unit 601 may be connected to both a wire and an antenna, by means of which the UE 600 is enabled to communicate with other nodes and/or entities in the wireless communication network. Similarly, the communication unit 601 may comprise more than one transmitting arrangement, which in turn is connected to both a wire and an antenna, by means of which the UE 600 is enabled to communicate with other nodes and/or entities in the wireless communication network. The UE 600 further comprises a memory 602 for storing data. Further, the UE 600 may comprise a control or processing unit (not shown) which in turn is connected to the different units 603-604. It shall be pointed out that this is merely an illustrative example and the UE 600 may comprise more, less or other units or modules which execute the functions of the UE 600 in the same manner as the units illustrated in FIG. 6.

It should be noted that FIG. 6 merely illustrates various functional units in the UE 600 in a logical sense. The functions in practice may be implemented using any suitable software and hardware means/circuits etc. Thus, the embodiments are generally not limited to the shown structures of the UE 600 and the functional units. Hence, the previously described exemplary embodiments may be realised in many ways. For example, one embodiment includes a computer-readable medium having instructions stored thereon that are executable by the control or processing unit for executing the method steps in the UE 600. The instructions executable by the computing system and stored on the computer-readable medium perform the method steps of the UE 600 as set forth in the claims.

The UE has the same possible advantages as the method performed by the UE. Once possible advantage is when the SFN is signalled to the UE, there is no need to align SFNs among different eNBs, the MeNB and the SeNB. Another possible advantage is that the UE gets accurate timing information when SFNs are not aligned between eNBs, the MeNB and the SeNB. Still a possible advantage is that the UE does not need to monitor MIB of the SeNB and SeNB does not need to broadcast it which may save radio resources.

The UE 500, 600 may further be configured for receiving other system Information by means of dedicated RRC signalling from the MeNB.

According to another embodiment of the UE 500, 600, the UE is configured for receiving, from the MeNB, a SFN of the MeNB from the MIB; and receiving, from the MeNB, an SFN offset relating to the offset between the SFN of the SeNB and the SFN of the MeNB by means of dedicated RRC signalling.

The UE 500, 600 may further be configured for determining the SFN of the SeNB based on the SFN of the MeNB and the SFN offset.

The UE 500, 600 may further be configured for receiving, from the SeNB, a request to acquire the SFN of the MeNB from the MIB; and for transmitting the SFN of the MeNB to the SeNB.

In an example, a starting time of radio frames in the MeNB is denoted t1 and a starting time of radio frames in the SeNB is denoted t2, wherein t2>t1, a frame_offset is defined as t2−t1, wherein when (a) a time difference between a current moment, t, and the next radio frame boundary of the SeNB is bigger than the frame_offset, then the SFN of the SeNB is defined as the SFN of the MeNB+the SFN offset; and (b) the time difference between a current moment, t, and the next radio frame boundary of the SeNB is smaller than the frame_offset, then the SFN of the SeNB is defined as the SFN of the MeNB+the SFN offset−1.

Embodiments herein also relate to a MeNB operable in a wireless communication system, the wireless communication system being adapted to provide for dual connectivity between the MeNB, and a UE, and between the UE and a SeNB, the method being performed for providing system information of the wireless communication system to the UE.

Embodiments of such a MeNB will now be described with reference to FIGS. 7 and 8, which are block diagrams of embodiments of such a MeNB. The MeNB has the same technical features, objects and advantages as the method performed by the MeNB. The MeNB will only be described in brief in order to avoid unnecessary repetition.

Figure 7:
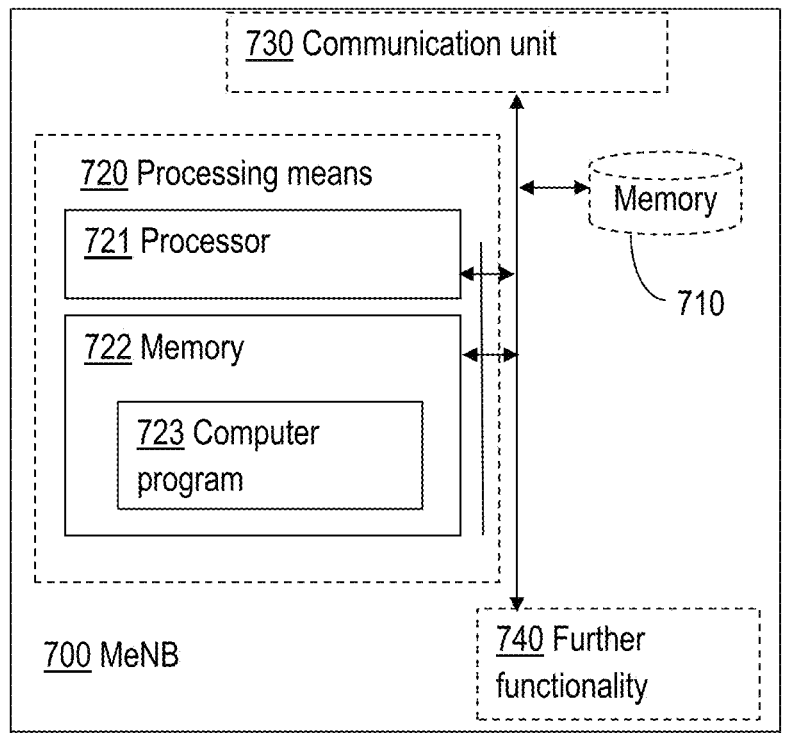
FIG. 7 is a block diagram of a MeNB for providing system information of the wireless communication system to a UE according to an exemplifying embodiment.
Figure 8:
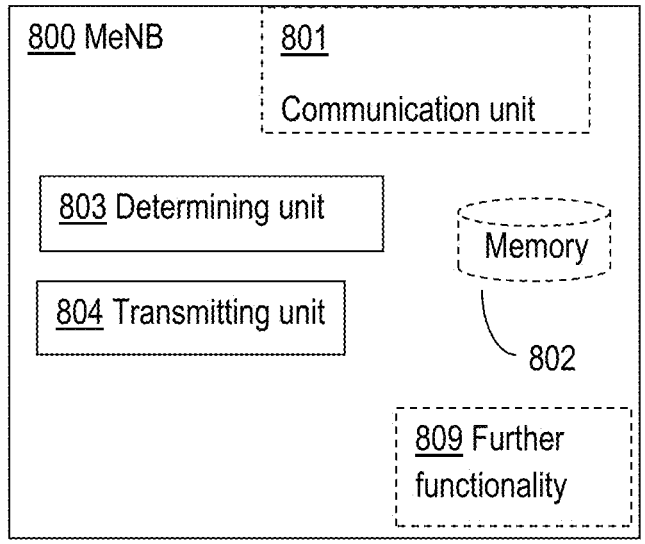
FIG. 8 is a block diagram of a MeNB for providing system information of the wireless communication system to a UE according to still an exemplifying embodiment.

FIGS. 7 and 8 illustrate the MeNB 700, 800 being configured for determining a SFN offset with regard to the MeNB and the SeNB; and for transmitting the SFN offset to the UE by means of dedicated Radio Resource Control, RRC, signalling.

The MeNB 700, 800 may be realised or implemented in various different ways. A first exemplifying implementation is illustrated in FIG. 7. FIG. 7 illustrate the MeNB 700 comprising a processor 721 and memory 722, the memory comprising instructions, e.g. by means of a computer program 723, which when executed by the processor 721 causes the MeNB 700 to determine a SFN offset with regard to the MeNB and the SeNB; to transmit the SFN offset to the UE by means of dedicated Radio Resource Control, RRC, signalling.

FIG. 7 also illustrates the MeNB 700 comprising a memory 710. It shall be pointed out that FIG. 7 is merely an exemplifying illustration and memory 710 may be optional, be a part of the memory 722 or be a further memory of the MeNB. The memory may for example comprise information relating to the MeNB 700, to statistics of operation of the MeNB 700, just to give a couple of illustrating examples. FIG. 7 further illustrates the MeNB 700 comprising processing means 720, which comprises the memory 722 and the processor 721. Still further, FIG. 7 illustrates the MeNB 700 comprising a communication unit 730. The communication unit 730 may comprise an interface through which the MeNB 700 communicates with other nodes or entities of the communication network as well as wireless devices of the communication network. FIG. 7 also illustrates the MeNB 700 comprising further functionality 740. The further functionality 740 may comprise hardware of software necessary for the MeNB 700 to perform different tasks that are not disclosed herein. Merely as an illustrative example, the further functionality may comprise a scheduler for scheduling transmissions from the MeNB 700 and/or for transmissions from wireless devices with which the MeNB 700 communicates with.

An alternative exemplifying implementation of the MeNB is illustrated in FIG. 8. FIG. 8 illustrates the MeNB 800 comprising a determining unit 803 for determining a SFN offset with regard to the MeNB and the SeNB; a transmitting unit 804 for transmitting the SFN offset to the UE by means of dedicated Radio Resource Control, RRC, signalling.

In FIG. 8, the MeNB 800 is also illustrated comprising a communication unit 801. Through this unit, the MeNB 800 is adapted to communicate with other nodes and/or entities in the wireless communication network. The communication unit 801 may comprise more than one receiving arrangement. For example, the communication unit 801 may be connected to both a wire and an antenna, by means of which the MeNB 800 is enabled to communicate with other nodes and/or entities in the wireless communication network. Similarly, the communication unit 801 may comprise more than one transmitting arrangement, which in turn is connected to both a wire and an antenna, by means of which the MeNB 800 is enabled to communicate with other nodes and/or entities in the wireless communication network. The MeNB 800 further comprises a memory 802 for storing data. Further, the MeNB 800 may comprise a control or processing unit (not shown) which in turn is connected to the different units 803-804. It shall be pointed out that this is merely an illustrative example and the MeNB 800 may comprise more, less or other units or modules which execute the functions of the MeNB 800 in the same manner as the units illustrated in FIG. 8.

It should be noted that FIG. 8 merely illustrates various functional units in the MeNB 800 in a logical sense. The functions in practice may be implemented using any suitable software and hardware means/circuits etc. Thus, the embodiments are generally not limited to the shown structures of the MeNB 800 and the functional units. Hence, the previously described exemplary embodiments may be realised in many ways. For example, one embodiment includes a computer-readable medium having instructions stored thereon that are executable by the control or processing unit for executing the method steps in the MeNB 800. The instructions executable by the computing system and stored on the computer-readable medium perform the method steps of the MeNB 800 as set forth in the claims.

The MeNB has the same possible advantages as the method performed by the MeNB. One possible advantage is when the SFN is signalled to the UE, there is no need to align SFNs among different eNBs, the MeNB and the SeNB. Another possible advantage is that the UE gets accurate timing information when SFNs are not aligned between eNBs, the MeNB and the SeNB. Still a possible advantage is that the UE does not need to monitor MIB of the SeNB and SeNB does not need to broadcast it which may save radio resources.

The MeNB 700, 800 may further be configured for determining SFN offset by receiving the SFN offset from the SeNB by means of X2 signalling.

The MeNB 700, 800 may still further be configured for determining SFN offset based on the received SFN offset from the SeNB and based on a time reference such as GPS time.

The MeNB 700, 800 may yet further be configured for determining SFN offset by reading broadcast information received from the SeNB.

Embodiments herein also relate to a SeNB operable in a wireless communication system, the wireless communication system being adapted to provide for dual connectivity between the SeNB, and a UE, and between the UE and a MeNB, the SeNB being configured for providing system information of the wireless communication system to the UE.

Embodiments of such a SeNB will now be described with reference to FIGS. 9 and 10, which are block diagrams of embodiments of such a SeNB. The SeNB has the same technical features, objects and advantages as the method performed by the SeNB. The SeNB will only be described in brief in order to avoid unnecessary repetition.

Figure 9:
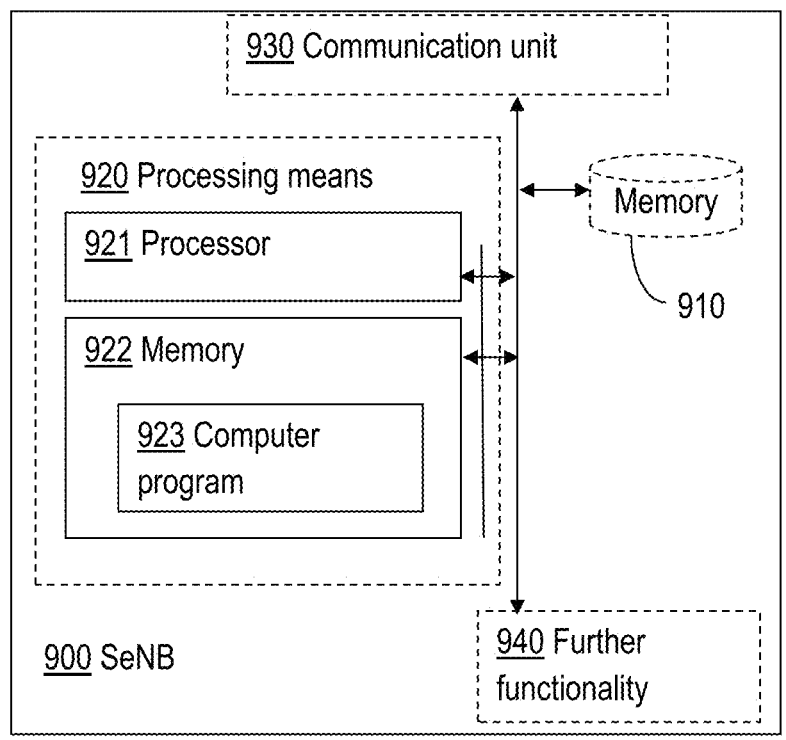
FIG. 9 is a block diagram of a SeNB for providing system information of the wireless communication system to a UE according to an exemplifying embodiment.
Figure 10:
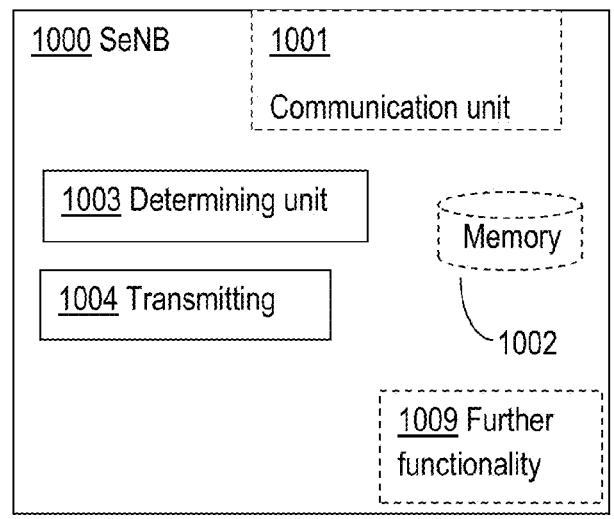
FIG. 10 is a block diagram of a SeNB for providing system information of the wireless communication system to a UE according to another exemplifying embodiment.

FIGS. 9 and 10 illustrate the SeNB 900, 1000 being configured for determining a System Frame Number, SFN, offset with regard to the MeNB and the SeNB; and for transmitting the SFN offset to the MeNB by means of S1 or X2 signalling.

The SeNB 900, 1000 may be realised or implemented in various different ways. A first exemplifying implementation is illustrated in FIG. 9. FIG. 9 illustrate the SeNB 900 comprising a processor 921 and memory 922, the memory comprising instructions, e.g. by means of a computer program 923, which when executed by the processor 921 causes the SeNB 900 to determine a SFN offset with regard to the MeNB and the SeNB; and to transmit the SFN offset to the MeNB by means of S1 or X2 signalling.

FIG. 298 also illustrates the SeNB 900 comprising a memory 910. It shall be pointed out that FIG. 9 is merely an exemplifying illustration and memory 910 may be optional, be a part of the memory 922 or be a further memory of the SeNB. The memory may for example comprise information relating to the SeNB 900, to statistics of operation of the SeNB 900, just to give a couple of illustrating examples. FIG. 9 further illustrates the SeNB 900 comprising processing means 920, which comprises the memory 922 and the processor 921. Still further, FIG. 9 illustrates the SeNB 900 comprising a communication unit 930. The communication unit 930 may comprise an interface through which the SeNB 900 communicates with other nodes or entities of the communication network as well as wireless devices of the communication network. FIG. 9 also illustrates the SeNB 900 comprising further functionality 940. The further functionality 940 may comprise hardware of software necessary for the SeNB 900 to perform different tasks that are not disclosed herein. Merely as an illustrative example, the further functionality may comprise a scheduler for scheduling transmissions from the SeNB 900 and/or for transmissions from wireless devices with which the SeNB 900 communicates with.

An alternative exemplifying implementation of the SeNB 900, 1000 is illustrated in FIG. 10. FIG. 10 illustrates the SeNB 1000 comprising a determining unit 1003 for determining a System Frame Number, SFN, offset with regard to the MeNB and the SeNB; and a transmitting unit 2904 for transmitting the SFN offset to the MeNB by means of S1 or X2 signalling.

In FIG. 10, the SeNB 1000 is also illustrated comprising a communication unit 1001. Through this unit, the SeNB 1000 is adapted to communicate with other nodes and/or entities in the wireless communication network. The communication unit 1001 may comprise more than one receiving arrangement. For example, the communication unit 1001 may be connected to both a wire and an antenna, by means of which the SeNB 1000 is enabled to communicate with other nodes and/or entities in the wireless communication network. Similarly, the communication unit 1001 may comprise more than one transmitting arrangement, which in turn is connected to both a wire and an antenna, by means of which the SeNB 1000 is enabled to communicate with other nodes and/or entities in the wireless communication network. The SeNB 1000 further comprises a memory 1002 for storing data. Further, the SeNB 1000 may comprise a control or processing unit (not shown) which in turn is connected to the different units 1003-1004. It shall be pointed out that this is merely an illustrative example and the SeNB 1000 may comprise more, less or other units or modules which execute the functions of the SeNB 1000 in the same manner as the units illustrated in FIG. 10.

It should be noted that FIG. 10 merely illustrates various functional units in the SeNB 1000 in a logical sense. The functions in practice may be implemented using any suitable software and hardware means/circuits etc. Thus, the embodiments are generally not limited to the shown structures of the SeNB 1000 and the functional units. Hence, the previously described exemplary embodiments may be realised in many ways. For example, one embodiment includes a computer-readable medium having instructions stored thereon that are executable by the control or processing unit for executing the method steps in the SeNB 1000. The instructions executable by the computing system and stored on the computer-readable medium perform the method steps of the SeNB 2900 as set forth in the claims.

The SeNB has the same possible advantages as the method performed by the SeNB. One possible advantage is when the SFN is signalled to the UE, there is no need to align SFNs among different eNBs, the MeNB and the SeNB. Another possible advantage is that the UE gets accurate timing information when SFNs are not aligned between eNBs, the MeNB and the SeNB. Still a possible advantage is that the UE does not need to monitor MIB of the SeNB and SeNB does not need to broadcast it which may save radio resources.

The SeNB 900, 1000 may further be configured for determining SFN offset by reading a broadcast channel of the MeNB, obtaining a MIB comprising the SFN of the MeNB and determining the SFN offset based on the SFN of the SeNB and the SFN of the MeNB.

The SeNB 900, 1000 may still further be configured for determining SFN offset by requesting the SFN of the MeNB from the UE, receiving the SFN of the MeNB from the UE, and determining the SFN offset based on the SFN of the SeNB and the SFN of the MeNB.

Figure 11:
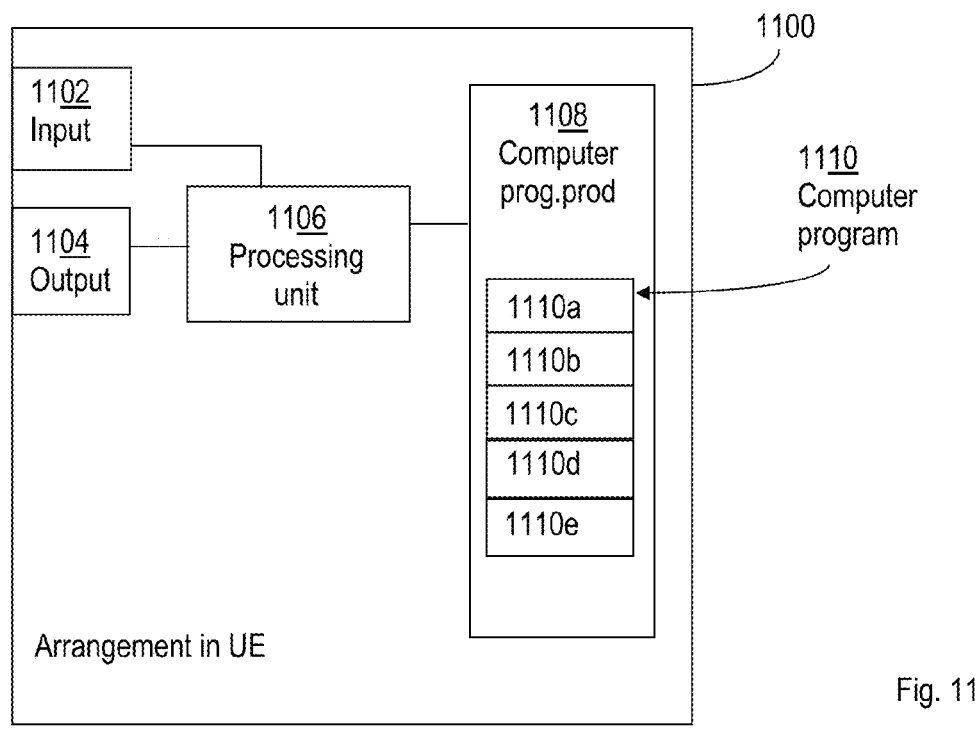
FIG. 11 is a block diagram of an arrangement in a UE for acquiring system information of the wireless communication system according to yet an exemplifying embodiment.

FIG. 11 schematically shows an embodiment of an arrangement 1100 in a UE. Comprised in the arrangement 1100 in the UE are here a processing unit 1106, e.g. with a Digital Signal Processor, DSP. The processing unit 1106 may be a single unit or a plurality of units to perform different actions of procedures described herein. The arrangement 1100 in the UE may also comprise an input unit 1102 for receiving signals from other entities, and an output unit 1104 for providing signal(s) to other entities. The input unit and the output unit may be arranged as an integrated entity or as illustrated in the example of FIG. 6, as one or more interfaces 601.

Furthermore, the arrangement 1100 in the UE comprises at least one computer program product 1108 in the form of a non-volatile memory, e.g. an Electrically Erasable Programmable Read-Only Memory, EEPROM, a flash memory and a hard drive. The computer program product 1108 comprises a computer program 1110, which comprises code means, which when executed in the processing unit 3206 in the arrangement 1100 in the UE causes the UE to perform the actions e.g. of the procedure described earlier in conjunction with FIG. 1.

The computer program 1110 may be configured as a computer program code structured in computer program modules 1110a-1110e. Hence, in an exemplifying embodiment, the code means in the computer program of the arrangement 1100 in the UE comprises a receiving unit, or module, for receiving, from the SeNB, a MIB of a cell of the SeNB; and an acquiring unit, or module for acquiring a SFN from the MIB.

The computer program modules could essentially perform the actions of the flow illustrated in FIG. 1, to emulate the UE 600. In other words, when the different computer program modules are executed in the processing unit 1106, they may correspond to the units 9603-604 of FIG. 6.

Figure 12:
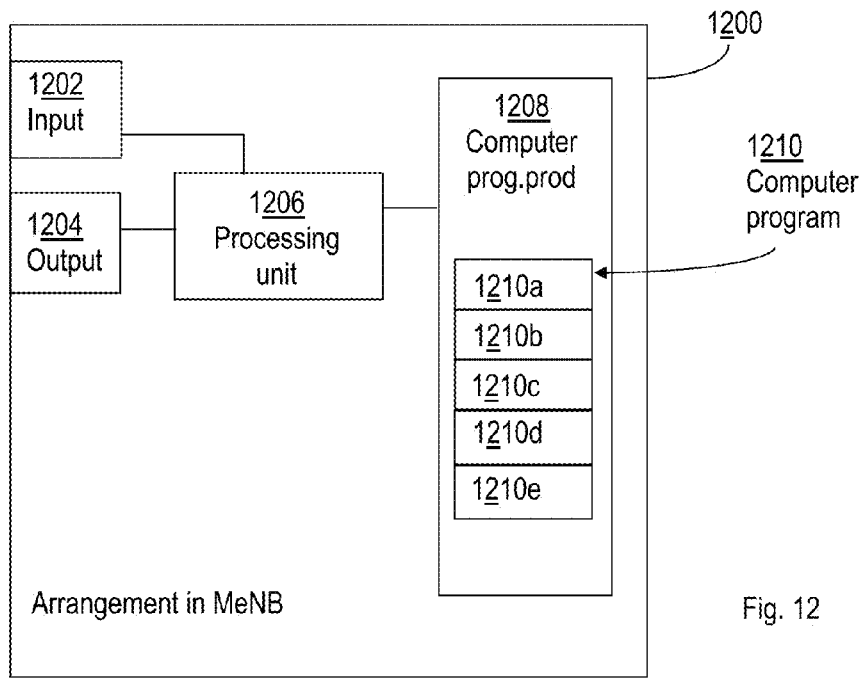
FIG. 12 is a block diagram of an arrangement in a MeNB for providing system information of the wireless communication system to a UE according to an exemplifying embodiment.

FIG. 12 schematically shows an embodiment of an arrangement 1200 in a MeNB. Comprised in the arrangement 1200 in the MeNB are here a processing unit 1206, e.g. DSP. The processing unit 1206 may be a single unit or a plurality of units to perform different actions of procedures described herein. The arrangement 1200 in the MeNB may also comprise an input unit 1202 for receiving signals from other entities, and an output unit 1204 for providing signal(s) to other entities. The input unit and the output unit may be arranged as an integrated entity or as illustrated in the example of FIG. 8, as one or more interfaces 801.

Furthermore, the arrangement 1200 in the MeNB comprises at least one computer program product 1208 in the form of a non-volatile memory, e.g. an EEPROM, a flash memory and a hard drive. The computer program product 3308 comprises a computer program 1210, which comprises code means, which when executed in the processing unit 1206 in the arrangement 1200 in the MeNB causes the MeNB to perform the actions e.g. of the procedure described earlier in conjunction with FIGS. 2a-2c.

The computer program 1210 may be configured as a computer program code structured in computer program modules 1210a-1210e. Hence, in an exemplifying embodiment, the code means in the computer program of the arrangement 1200 in the MeNB comprises a determining unit, or module, for determining a SFN offset with regard to the MeNB and the SeNB. The computer program further comprises a transmitting unit, or module, for transmitting the SFN offset to the UE by means of dedicated Radio Resource Control, RRC, signalling.

The computer program modules could essentially perform the actions of the flow illustrated in FIGS. 2a-2c, to emulate the MeNB 800. In other words, when the different computer program modules are executed in the processing unit 1206, they may correspond to the units 803-804 of FIG. 8.

Figure 13:
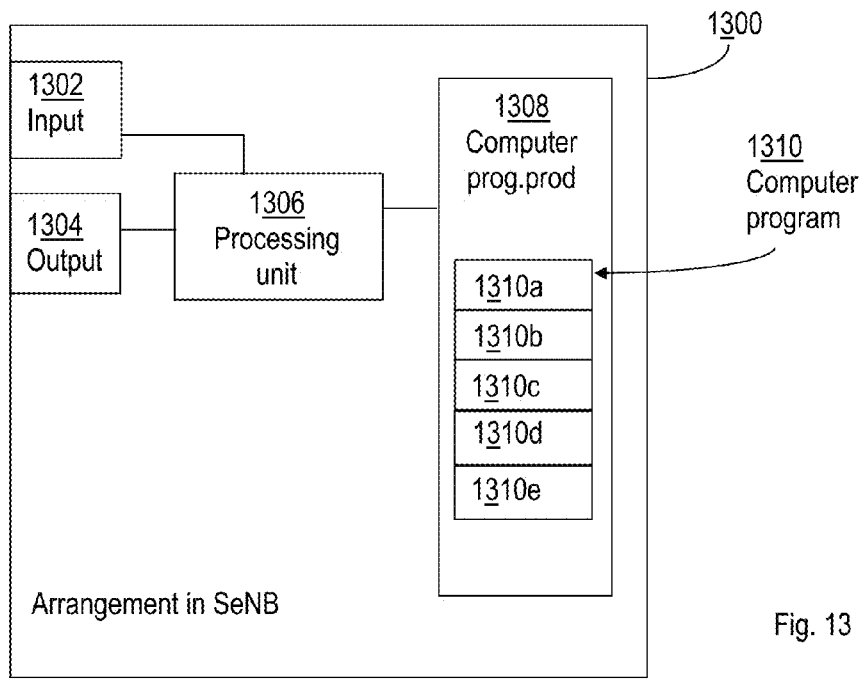
FIG. 13 is a block diagram of an arrangement in a SeNB for providing system information of the wireless communication system to a UE according to an exemplifying embodiment.

FIG. 13 schematically shows an embodiment of an arrangement 1300 in a SeNB. Comprised in the arrangement 1300 in the SeNB are here a processing unit 1306, e.g. DSP. The processing unit 1306 may be a single unit or a plurality of units to perform different actions of procedures described herein. The arrangement 1300 in the SeNB may also comprise an input unit 1302 for receiving signals from other entities, and an output unit 1304 for providing signal(s) to other entities. The input unit and the output unit may be arranged as an integrated entity or as illustrated in the example of FIG. 10, as one or more interfaces 1001.

Furthermore, the arrangement 1300 in the SeNB comprises at least one computer program product 1308 in the form of a non-volatile memory, e.g. an EEPROM, a flash memory and a hard drive. The computer program product 1308 comprises a computer program 1310, which comprises code means, which when executed in the processing unit 1306 in the arrangement 1300 in the SeNB causes the SeNB to perform the actions e.g. of the procedure described earlier in conjunction with FIG. 3.

The computer program 1310 may be configured as a computer program code structured in computer program modules 1310a-1310e. Hence, in an exemplifying embodiment, the code means in the computer program of the arrangement 1300 in the SeNB comprises a determining unit, or module, for determining a SFN offset with regard to the MeNB and the SeNB. The computer program further comprises a transmitting unit, or module, for transmitting the SFN offset to the MeNB by means of S1 or X2 signalling.

The computer program modules could essentially perform the actions of the flow illustrated in FIG. 3, to emulate the SeNB 1000. In other words, when the different computer program modules are executed in the processing unit 1306, they may correspond to the units 1003-1004 of FIG. 10.

Although the code means in the respective embodiments disclosed above in conjunction with FIGS. 6, 8 and 10 are implemented as computer program modules which when executed in the respective processing unit causes the UE, the MeNB and the SeNB respectively to perform the actions described above in the conjunction with figures mentioned above, at least one of the code means may in alternative embodiments be implemented at least partly as hardware circuits.

The processor may be a single Central Processing Unit, CPU, but could also comprise two or more processing units. For example, the processor may include general purpose microprocessors; instruction set processors and/or related chips sets and/or special purpose microprocessors such as Application Specific Integrated Circuits, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-Access Memory RAM, Read-Only Memory, ROM, or an EEPROM, and the computer program modules described above could in alternative embodiments be distributed on different computer program products in the form of memories within the UE, the MeNB, and the SeNB respectively.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

For purposes of illustration and explanation only, particular embodiments are described in the context of operating in a RAN that communicates over radio communication channels with UEs. It will be understood, however, any suitable type of communication network could be used. As used herein, a wireless terminal or UE may include any device that receives data from a communication network, and may include, but is not limited to, a mobile telephone ("cellular" telephone), laptop/portable computer, pocket computer, hand-held computer, desktop computer, a machine to machine (M2M) or MTC type device, a sensor with a wireless communication interface, etc.

In some embodiments of a RAN, several base stations may be connected (e.g. by landlines or radio channels) to a radio network controller, RNC. A radio network controller, also sometimes termed a base station controller, BSC, may supervise and coordinate various activities of the plural base stations connected thereto. A radio network controller may be connected to one or more core networks. According to some other embodiments of a RAN, base stations may be connected to one or more core networks without a separate RNC(s) there between, for example, with functionality of an RNC implemented at base stations and/or core networks.

The Universal Mobile Telecommunications System, UMTS, is a third generation mobile communication system, which evolved from GSM, and is intended to provide improved mobile communication services based on WCDMA technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for UEs.

The Third Generation Partnership Project, 3GPP, has undertaken to further evolve the UTRAN and GSM based radio access network technologies. In this regard, specifications for the Evolved Universal Terrestrial Radio Access Network, E-UTRAN, are ongoing within 3GPP. The E-UTRAN comprises the LTE and System Architecture Evolution, SAE.

Note that although certain terminology from 3GPP LTE is used in some example embodiments described above, this should not be seen as limiting. Other wireless systems, such as WCDMA, HSPA, WiMAX, Ultra Mobile Broadband, UMB, HSDPA, GSM etc. may be used in other embodiments.

Also note that terminology such as base station (also referred to as NodeB, eNodeB, or Evolved Node B) and wireless terminal (also referred to as User Equipment node or UE) should be considering non-limiting and does not imply a certain hierarchical relation between the two. In general, a base station (e.g. a "NodeB" or "eNodeB") and a wireless terminal (e.g. a "UE") may be considered as examples of respective different communications devices that communicate with each other over a wireless radio channel. While embodiments discussed herein may focus on wireless transmissions in a downlink from a NodeB to a UE, embodiments of the disclosed concepts may also be applied, for example, in an uplink. Furthermore, although the description above focuses, for purposes of illustration, on example embodiments in which described solutions are applied in heterogeneous networks that include a mix of relatively higher-power (e.g. "macro") base stations and relatively lower-power node (e.g. "pico") base stations, the described techniques may be applied in any suitable type of network, including both homogeneous and heterogeneous configurations. Thus, the base stations involved in the described configurations may be similar or identical to one another, or may differ in terms of transmission power, number of transmitter-receiver antennas, processing power, receiver and transmitter characteristics, and/or any other functional or physical capability.

With the proliferation of user friendly smart phones and tablets, the usage of high data rate services such as video streaming over the mobile network is becoming commonplace, greatly increasing the amount of traffic in mobile networks. Thus, there is a great urgency in the mobile network community to ensure that the capacity of mobile networks keeps up increasing with this ever-increasing user demand. The latest systems such as LTE, especially when coupled with interference mitigation techniques, have spectral efficiencies very close to the theoretical Shannon limit. The continuous upgrading of current networks to support the latest technologies and densifying the number of base stations per unit area are two of the most widely used approaches to meet the increasing traffic demands.

Yet another approach that is gaining high attention is to use Heterogeneous Networks where the traditional pre-planned macro base stations (known as the macro layer) are complemented with several low-powered base stations that may be deployed in a relatively unplanned manner. The 3GPP has incorporated the concept of Heterogeneous Networks as one of the core items of study in the latest enhancements of LTE, such as LTE release 11, and several low-powered base stations to realise heterogeneous networks such as pico base stations, femto base stations (also known as home base stations or HeNBs), relays, and Remote Radio Heads, RRHs, have been defined.

Initial discussions for LTE release 12 have begun, and one of the proposed items for study is the possibility of serving a UE from more than one eNB simultaneously. The current legacy handover mechanisms of LTE may have to be updated to support this.

Figure 14:
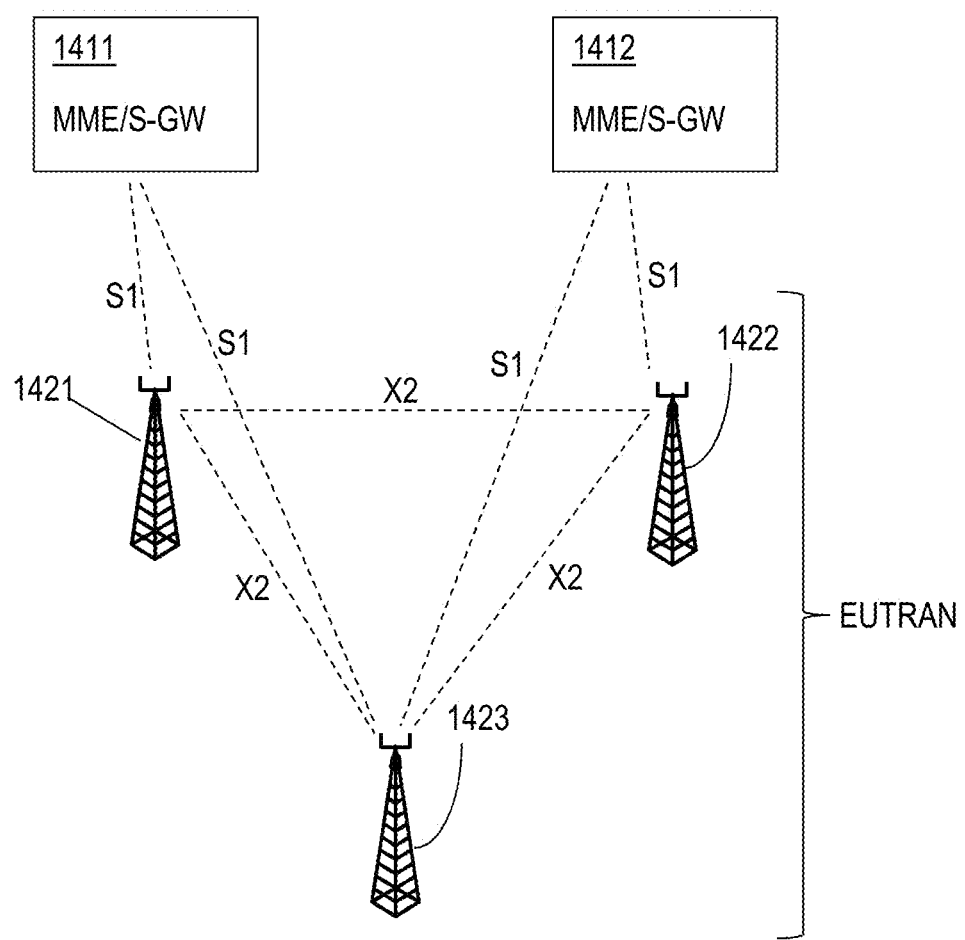
FIG. 14 is a schematic/block diagram illustrating the overall E-UTRAN architecture.

The E-UTRAN includes base stations called enhanced NodeBs, eNBs, providing the E-UTRA user plane and control plane protocol terminations towards the UE. The eNBs are interconnected with each other using the X2 interface. The eNBs are also connected using the S1 interface to the Evolved Packet Core, EPC, more specifically to the Mobility Management Entity, MME, by means of the S1-MME interface and to the Serving Gateway, S-GW, by means of the S1-U interface. The S1 interface supports many-to-many relation between MMEs/S-GWs and eNBs. The E-UTRAN architecture is illustrated in FIG. 14.

The eNB hosts functionalities such as Radio Resource Management, RRM, radio bearer control, admission control, header compression of user plane data towards serving gateway, and/or routing of user plane data towards the serving gateway. The MME is the control node that processes the signalling between the UE and the core network, CN. Significant functions of the MME are related to connection management and bearer management, which are handled via Non Access Stratum, NAS, protocols. The S-GW is the anchor point for UE mobility, and also includes other functionalities such as temporary down link, DL, data buffering while the UE is being paged, packet routing and forwarding to the right eNB, and/or gathering of information for charging and lawful interception. The PDN Gateway, P-GW, is the node responsible for UE IP address allocation, as well as Quality of Service, QoS, enforcement, as further discussed below.

Figure 15:
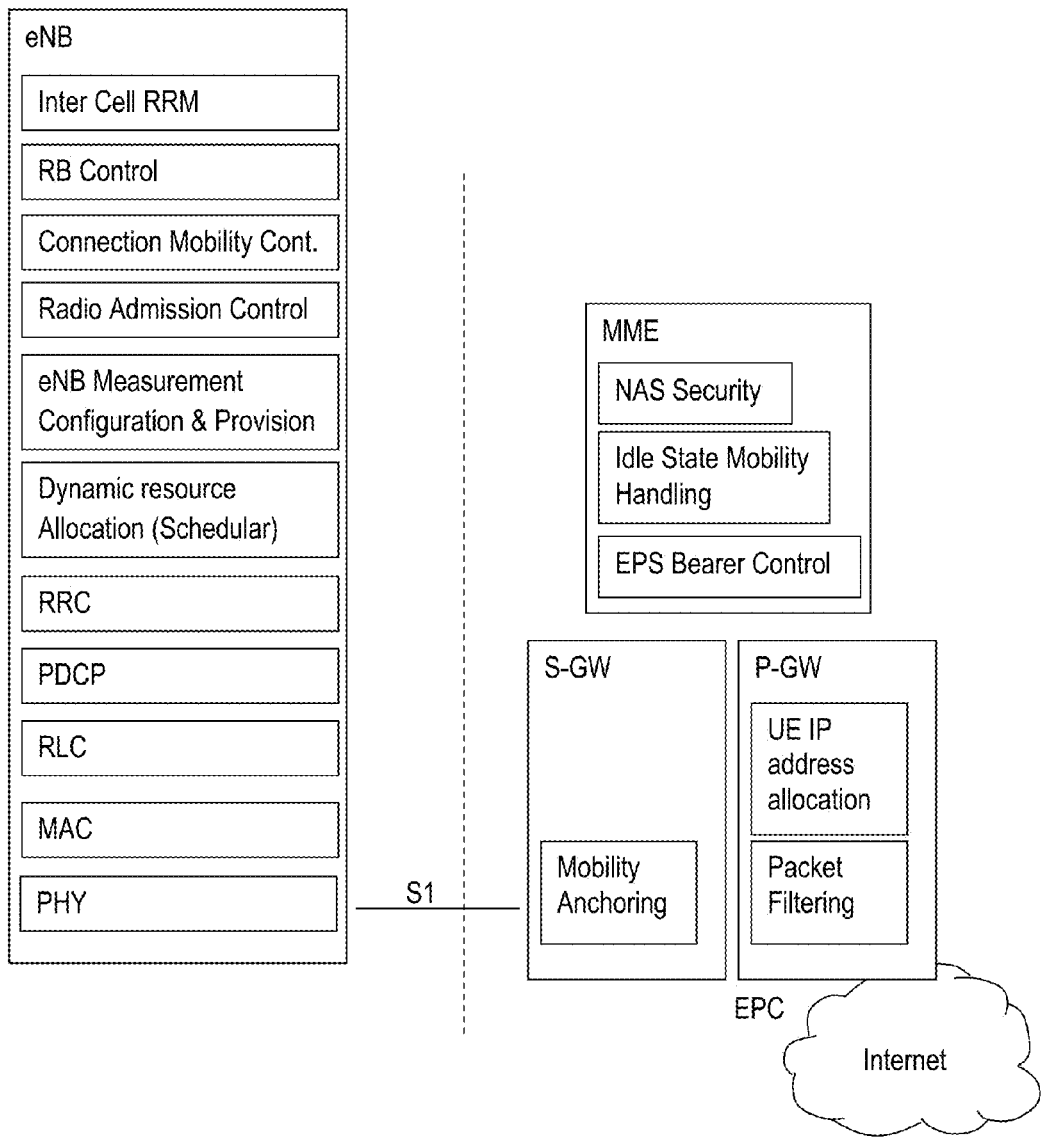
FIG. 15 is a block diagram illustrating a functional split between E-UTRAN and the Evolved Packet Core (EPC).

FIG. 15 illustrates a summary of functionalities of the different nodes, and the reader is referred to 3GPP TS 36.300 v.12.3.0 and the references therein for further details of functionalities of the different nodes. In FIG. 15, blocks eNB, MME, S-GW, and P-GW illustrate logical nodes; blocks Inter Cell RRM, RB Control, Connection Mobility Cont., Radio Admission Control, eNB Measurement Configuration & Provision, Dynamic Resource Allocation (Scheduler), NAS Security, Idle State Mobility Handling, EPS bearer Control, Mobility Anchoring, UE IP address allocation, and Packet Filtering illustrate functional entities of the control plane; and blocks RRC, PDCP, RLC, MAC, and PHY illustrate the radio protocol layers.

Figure 16:
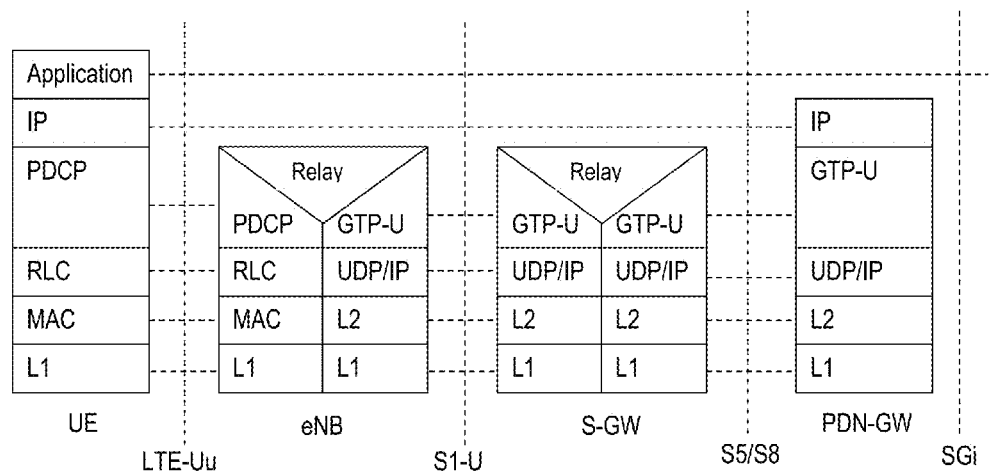
FIG. 16 is a schematic diagram illustrating a user plane protocol stack.

The radio protocol architecture of E-UTRAN is divided into the user plane and the control plane. FIG. 16 illustrates the protocol stack for the user-plane. The user plane protocol stack includes the Packet Data Convergence Protocol, PDCP, Radio Link Control, RLC, and Medium Access Control, MAC, which are terminated at the eNB. The PDCP manages IP packets in the user plane and it performs functionalities such as header compression, security, and reordering and retransmission during handover. The RLC layer is mainly responsible for segmentation (and corresponding assembly) of PDCP packets, so that they fit the size that is actually to be transmitted over the air interface. RLC can operate either in unacknowledged mode or acknowledged mode, where the latter supports retransmissions. The MAC layer performs multiplexing of data from different radio bearers, and it is the one that informs the RLC about the size of the packets to provide, which is decided based on the required QoS each radio bearer and the current capacity available to the UE.

Figure 17:
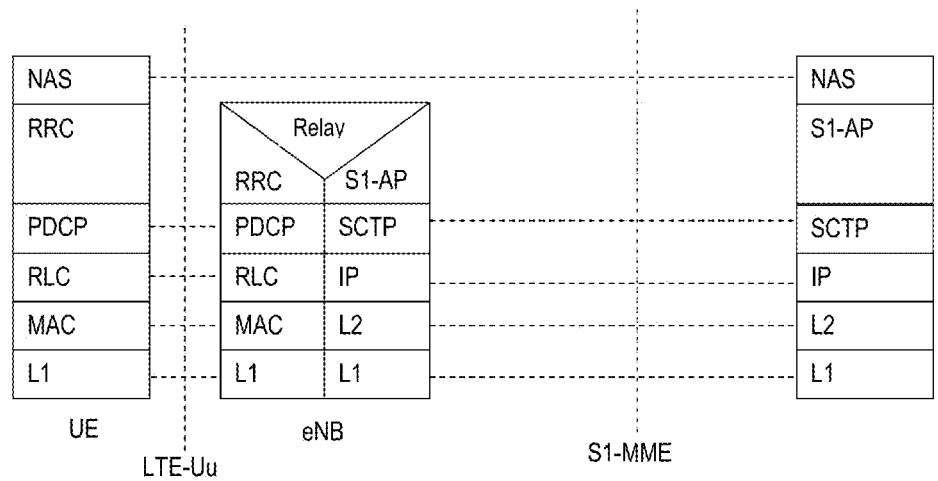
FIG. 17 is a schematic diagram illustrating a control plane protocol stack.

FIG. 17 illustrates the control plane protocol stack. The layers below the Radio Resource Control, RRC, layer perform the same functionality as in the user plane, except that there is no header compression in the control plane. The main functions of the RRC are the broadcasting of system information, RRC connection control (establishment, modification, and release of RRC connection, establishment of signalling radio bearers, SRB, and data radio bearers, DRBs, handover, configuration of lower protocol layers, radio link failure recovery, etc.), and measurement configuration and reporting. Details of the RRC protocol functionalities and procedures can be found in 3GPP TS 36.331 v12.3.0.

A UE is uniquely identified over the S1 interface within an eNB with the eNB UE S1AP ID. When an MME receives an eNB UE S1AP ID, the MME stores it for the duration of the UE-associated logical S1-connection for this UE. Once known to an MME, this IE (information element) is included in all UE-associated S1-AP signalling. The eNB UE S1AP ID is unique within the eNB, and a UE is assigned a new S1AP ID after a handover by the target eNB.

From the MME side, a UE is uniquely identified using the MME UE S1AP ID. When an eNB receives MME UE S1AP ID, the eNB stores it for the duration of the UE-associated logical S1 connection for this UE. Once known to an eNB, this IE is included in all UE-associated S1-AP signalling. The MME UE S1AP ID is unique within the MME, and it is changed if the UE's MME changes (for example, handover between two eNBs connected to different MMEs).

Figure 18:
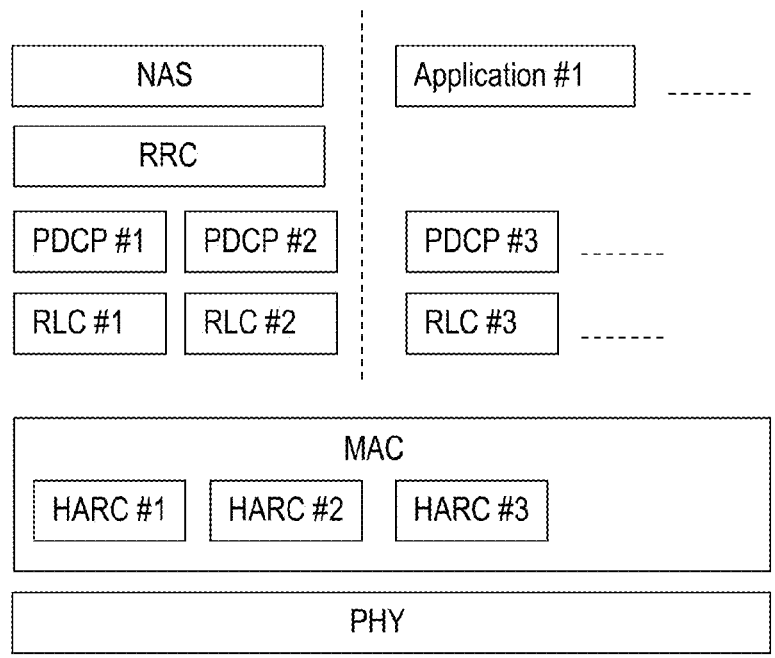
FIG. 18 is a block diagram illustrating user plane and control plane data flows.

The flow of user plane and control plane data is illustrated in FIG. 18. There is only one MAC entity per UE (unless the UE supports multiple carriers in the case of Dual Connectivity), and under this MAC entity several Hybrid automatic repeat request, HARQ, processes might be running simultaneously, for rapid retransmissions. There is a separate RLC entity for each radio bearer and if the radio bearer is configured to use PDCP, there is also one separate PDCP entity for that bearer. A bearer is configured to use PDCP only if it is dedicated to a UE. In other words, multicast and broadcast data do not utilise PDCP both in the control and user plane, and the PDCP is used only for dedicated control message in the control plane and for dedicated UL/DL data in the user plane.

At the transmitting side, each layer receives a Service Data Unit, SDU, from a higher layer, and sends a Protocol Data Unit, PDU, to the lower layer. For example, PDCP PDUs are sent towards the RLC, and they are RLC SDUs from RLC point of view, which in turn sends RLC PDUs towards the MAC, which are MAC SDUs from the MAC point of view. At the receiving end, the process is reversed, i.e. each layer passing SDUs to the layer above it, where they are perceived as PDUs.

A UE can have multiple applications running at the same time, each having different QoS requirements, for example, VoIP, browsing, file download, etc. To support these different requirements, different bearers are set up, each being associated with a respective QoS. An EPS bearer/E-RAB (Evolved Radio Access Bearer) is the level of granularity for bearer level QoS control in the EPC/E-UTRAN. That is, Service Data Flows, SDF, mapped to the same EPS bearer receive the same bearer level packet forwarding treatment, e.g. scheduling policy, queue management policy, rate shaping policy, RLC configuration, etc.

One EPS bearer/E-RAB is established when the UE connects to a Packet Data Network, PDN, and that remains established throughout the lifetime of the PDN connection to provide the UE with always-on IP connectivity to that PDN. That bearer is referred to as the default bearer. Any additional EPS bearer/E-RAB that is established to the same PDN is referred to as a dedicated bearer. The initial bearer level QoS parameter values of the default bearer are assigned by the network, based on subscription data. The decision to establish or modify a dedicated bearer can only be taken by the EPC, and the bearer level QoS parameter values are always assigned by the EPC.

The packets of an EPS bearer are transported over a radio bearer between the UE and eNB. An S1 bearer transports the packets of an EPS bearer between the eNB and S-GW. An E-RAB is actually a concatenation of these two bearers (i.e. radio bearer and S1 bearer), and the two bearers are mapped on a one to one fashion. An S5/S8 bearer transports the packets of the EPS bearer between the S-GW and P-GW, and completes the EPS bearer. Here also there is a one to one mapping between the E-RAB and S5/S8 bearer.

System information, SI, may include parameters common for all terminals such as information related to how to access a cell, how to perform measurements, etc. In LTE, System Information is broadcasted in a broadcast channel. System Information is split to different blocks, named MIB and System Information Blocks, SIBs. The MIB and SIBs are transmitted on BCCH logical channel where the MIB is mapped to BCH and SIBs are mapped to DL-SCH. The UE may identify a SIB based on the specific C-RNTI on the PDCCH (i.e., SI RNTI).

The UE has a mechanism to perform system information acquisition (SIA). During initial power on, the UE reads relevant SIBs. Then the UE monitors paging occasions to detect any modification notifications. If detected, the UE updates the SIBs in the beginning of the next modification boundary. If the UE misses paging due to coverage reasons, it can verify the validity of SIBs from the valueTag in SIB1. In Rel-10 CA, the UE receives the System Information of SCells through relevant parameters provided by the eNB through dedicated RRC signalling.

Figure 19:
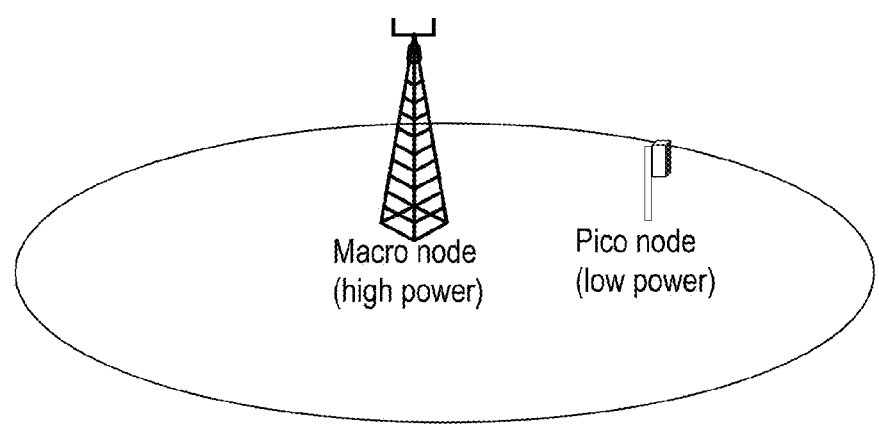
FIG. 19 is a schematic diagram illustrating an example of a heterogeneous deployment with a higher-power macro node and a lower-power pico node.

A heterogeneous deployment or heterogeneous network, as illustrated in FIG. 19, includes network transmission nodes, e.g. micro and pico nodes or base stations, operating with different transmit powers and with overlapping coverage areas. A heterogeneous deployment/network is considered as an interesting deployment strategy for cellular networks. In such a deployment, the low-power nodes ("pico nodes") are typically assumed to offer high data rates (Mbit/s) and/or to provide increased/high capacity (users/m2 or Mbit/s/m2) in the local areas where increased data rates/capacity is/are needed/desired, while the high-power nodes ("macro nodes") are assumed to provide full-area coverage. In practice, the macro nodes may correspond to currently deployed macro cells while the pico nodes are later deployed nodes, provided to extend capacity and/or achievable data rates within the macro-cell coverage area where needed/desired. FIG. 19 illustrates a heterogeneous deployment with a higher-power macro node and a lower-power pico node. In a typical case, there may be multiple pico nodes within the coverage area of a macro node.

Figure 20:
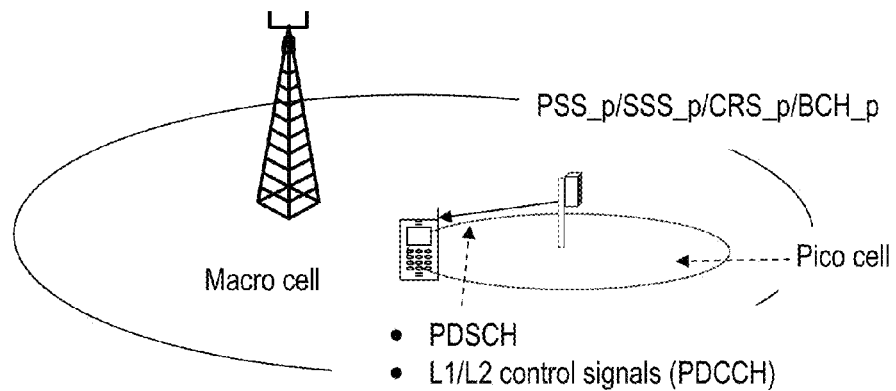
FIG. 20 is a schematic diagram illustrating an example heterogeneous deployment where the pico node corresponds to a cell of its own (a "pico cell"). The indices "p" and "m" indicate common signals/channels for the pico and macro cell respectively.

A pico node of a heterogeneous deployment may operate as a cell of its own (a "pico cell") as shown in FIG. 20. This means that, in addition to downlink and uplink data transmission/reception, the pico node also transmits the full set of common signals/channels associated with a cell. In the LTE context this full set of common signals/channels includes:

The Primary and Secondary Synchronisation Signals, PSS and SSS, corresponding to the Physical Cell Identity of the pico cell.

The Cell-specific reference signals, CRS, also corresponding to the Physical Cell Identity of the cell. The CRS can, for example, be used for downlink channel estimation to enable coherent demodulation of downlink transmissions.

Potentially Broadcast channel, BCH, with corresponding pico-cell system information. Additional system information may also be transmitted on the PDSCH physical channel.

As the pico node transmits the common signals/channels, the corresponding pico cell can be detected and selected (connected to) by a UE.

If the pico node corresponds to a cell of its own, also so-called L1/L2 control signalling on the Physical Downlink Control Channel of PDCCH (as well as Physical Control Format Indicator Channel or PCFICH and Physical Hybrid-ARQ Indicator Channel or PHICH) are transmitted from the pico node to connected terminals, in addition to downlink data transmission on the Physical Downlink Shared Channel or PDSCH. The L1/L2 control signalling, for example, provides downlink and uplink scheduling information and Hybrid-ARQ-related information to terminals within the cell. This is shown in FIG. 20.

FIG. 20 illustrates a heterogeneous deployment where the pico node corresponds to a cell of its own (a "pico cell"). The indices "p" and "m" indicate common signals/channels for the pico and macro cell respectively. As shown in FIG. 20, the pico node uses/transmits its own primary and secondary synchronisation signals PSSp and SSSp, cell specific reference signals CRSp, and potentially broadcast channel BCHp that are independent of (e.g. different than) the primary and secondary synchronisation signals PSSm and SSSm, cell specific reference signals CRSm, and broadcast channel BCHm used/transmitted by the macro node. Accordingly, the UE may communicate through the pico node without support from the macro node.

Figure 21:
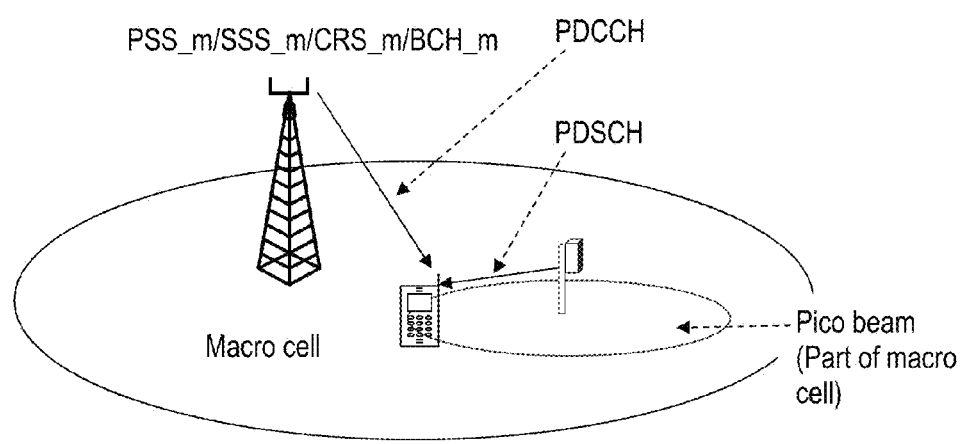
FIG. 21 is a schematic diagram illustrating an example heterogeneous deployment where the pico node does not correspond to a cell of its own.

Alternatively, a pico node within a heterogeneous deployment may not correspond to a separate cell of its own, but may instead provide a data-rate and/or capacity "extension" of the overlaid macro cell. This is sometimes known as "shared cell" or "soft cell". In this case, at least the CRS, physical broadcast channel, PBCH, PSS and SSS are transmitted from the macro node, but not the pico node. The PDSCH can be transmitted from the pico node. To allow for demodulation and detection of the PDSCH, despite the fact that no CRS is transmitted from the pico node, Demodulation reference signal, DM-RS, may be transmitted from the pico node together with the PDSCH. The UE-specific reference signals can then be used by the terminal for PDSCH demodulation/detection. This is shown in FIG. 21, which illustrates a heterogeneous deployment where the pico node does not correspond to or define a cell of its own.

Figure 22:
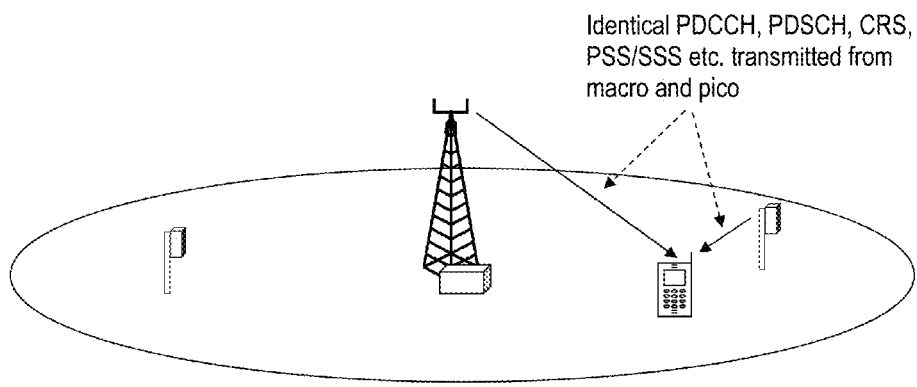
FIG. 22 is a schematic diagram illustrating single-frequency network operation with identical transmission from macro and pico (low power) nodes to a wireless terminal according to some embodiments.
Figure 23:
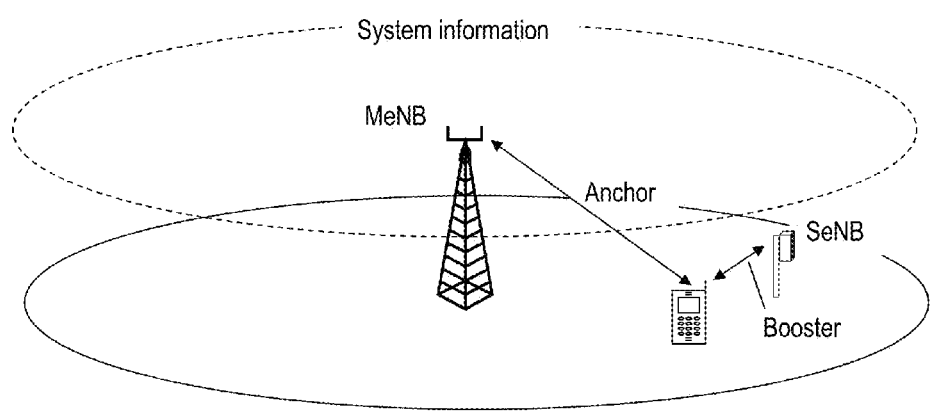
FIG. 23 is a schematic diagram illustrating dual connectivity operation with the UE (wireless terminal) having multiple connections with both the master (macro) and secondary (pico) nodes according to some embodiments.

Transmitting data from a pico node not transmitting CRS as described above may require DM-RS support in/at the UE ("non-legacy terminal"). In LTE, DM-RS-based PDSCH reception is supported in Rel-10 and for Frequency Division Duplex, FDD, while for the L1/L2 control signalling, DM-RS-based reception is planned for Rel-11. For terminals not supporting DM-RS-based reception ("legacy terminals") one possibility in a shared cell setting is to exploit SFN-type (Single Frequency Network type) of transmission. In essence identical copies of the signals and channels necessary for a legacy terminal are transmitted simultaneously from the macro and pico nodes. From a terminal perspective, this will look as a single transmission. Such an operation, which is illustrated in FIG. 22, may only provide a Signal to Interference and Noise Ration, SINR, gain, which can be translated into a higher data rate but not a capacity improvement, because transmission resources cannot be reused across sites within the same cell. As shown in FIG. 23, SFN operation may be provided with identical transmissions from macro and pico to a UE.

Assume that the macro nodes are able to provide coverage and the pico nodes are provided only for capacity enhancements (i.e. to reduce coverage holes), another alternative architecture is where the UE maintains connectivity to the macro node, or, more generally, the "Master eNB", MeNB, all the time, and adds connectivity to the pico node, or, more generally, the "Secondary eNB", SeNB, when it is in the coverage area of the pico node. The link between the UE and the MeNB may be referred to as the "anchor" link, while the link between the UE and SeNB can be referred to as the "booster" link. When both connections are active, the anchor link can be used for control signalling while the booster link is used for data. In addition, it may also be possible to send data via the anchor link. This is illustrated in FIG. 23. In this case, as in the previous cases, the system information is shown to be sent only from the MeNB, but it is still possible to send it also from the SeNB. As shown in FIG. 23, in soft cell operation, the UE may have multiple connections with both the anchor and booster nodes, also referred to as the macro and pico nodes.

The term "dual connectivity" is used to refer to operation where the UE consumes radio resources provided by at least two different network points connected with non-ideal backhaul. Furthermore, each eNB involved in dual connectivity for a UE may assume different roles. Those roles do not necessarily depend on the eNB's power class and can vary among UE.

Figure 24:
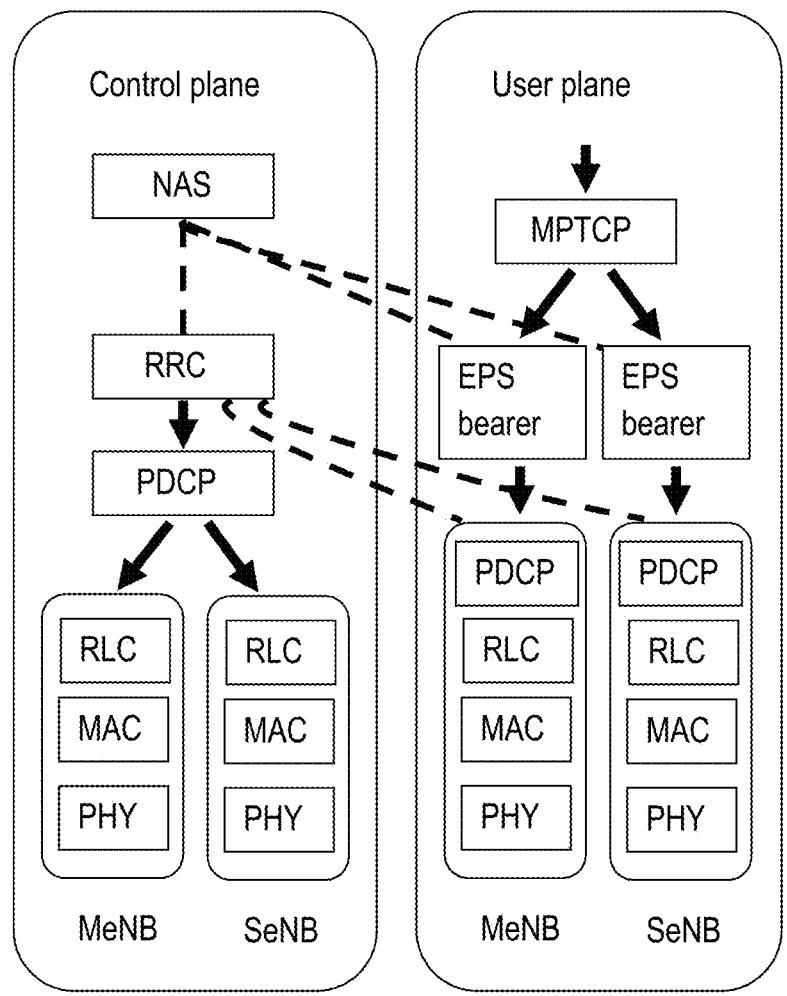
FIG. 24 is a block diagram illustrating a protocol architecture for multiple connectivity according to some embodiments.

To support multiple connectivity to micro and pico nodes, several architectural options are possible both for the control and user planes. For the user plane, a centralised approach may be provided where the PDCP, or even the RLC, terminated at the anchor node only and the booster node terminates at the RLC, or even the MAC, level. A decentralised approach may be to have the booster to terminate at the PDCP level. A similar approach can be taken in the control plane, i.e. distributed or centralised PDCP/RLC, but on top of that the additional dimension of centralising or distributing the RRC may be provided. FIG. 24 shows example control and user plane architectures where the user plane uses distributed PDCP, while the control plane is centralised at the PDCP level at the anchor node. Note that in FIG. 24, user plane aggregation (i.e. the possibility to split the packets belonging to one application data flow over the anchor and booster links) can be realised by using a higher layer aggregation protocol like multi-path TCP, MTCP.

Random access, RA, serves as an uplink control procedure to enable the UE to access the network. The RA procedures serve three main purposes:

The RA procedures let the UE align its uplink, UL, timing to that expected by the eNodeB in order to minimise interfering with other UEs transmissions. UL time alignment is a requirement in E-UTRAN before data transmissions can commence.

The RA procedures provide a means for the UE to notify the network of its presence and enable the eNodeB to give the UE initial access to the system.

The RA procedures notify the eNB that the UE has data in its uplink buffer.

In addition to its usage during initial access, the RA procedures are also used when the UE has lost the uplink synchronisation.

Figure 25:
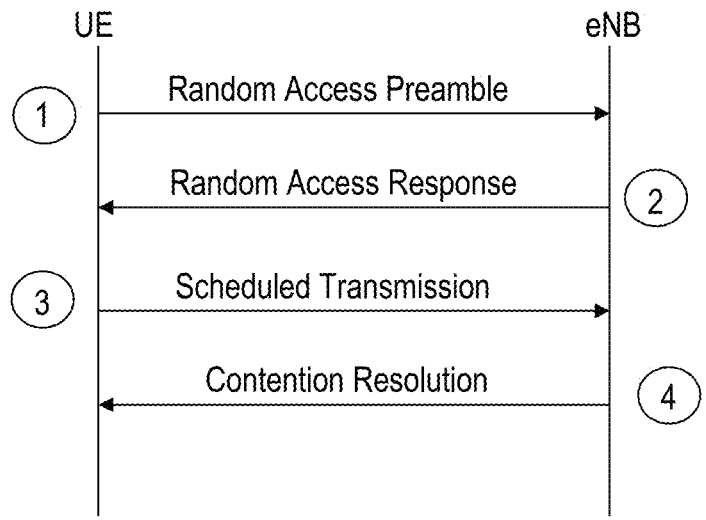
FIG. 25 is a signal flow diagram illustrating a contention-based random access procedure in LTE.

The basic RA Procedure is a four-phase procedure as outlined in FIG. 25.

Phase 1 consists of transmission of a random access preamble by the UE, allowing the eNB to estimate the transmission timing of the UE. Uplink synchronisation is necessary as the UE otherwise cannot transmit any uplink data. The preamble used in this step can be either randomly selected by the UE in contention-based Random Access procedures, or dedicated by the network in contention-free Random Access procedures. The latter solution can be used in case of handover, for example, when the target eNB may signal dedicated random access information to the source eNB, which will further convey that information to the UE.

Phase 2 consists of the network transmitting the Random Access Response message. This message includes the timing advance command to correct the uplink timing, based on the timing of arrival measurement in the first step. In addition to establishing uplink synchronisation, the second step also assigns uplink resources. In the case of contention based random access, a temporary identifier to the UE is included, to be used in the third step in the random access procedure.

Phase 3 consists of signalling from the UE to the eNB, also called as Msg3. This step is included in contention-based Random Access. A primary function of this message is to uniquely identify the UE. The exact content of this signalling depends on the state of the UE, e.g. whether it is previously known to the network or not. In connected state, the UE includes at least its C-RNTI in the Msg3.

Phase 4, the final phase, is responsible for contention resolution to solve the potential case when in case multiple UEs tried to access the system on the same resource. This phase is used in contention-based Random Access procedure.

The UE obtains information about which preambles are available, either to select one at random or to use a specified one, whether one or repeated preambles should be used, what the desired received power level should be at the base station, what power increase step should be used in case of failed preamble reception, what the maximum number of random access preamble transmission is, when it is allowed to transmit the preamble, etc.

If the UE obtains the Phase I information via dedicated signalling, such as when random access is performed as part of handover (the dedicated signalling originated from the target cell, forwarded to the UE by the serving cell), a specific preamble may be configured. In addition, the timer T304 is started with a value provided by the dedicated signalling.

The UE determines a random access resource for preamble transmission in consideration of the retrieved information. Either, the information is related to the downlink synchronisation of the serving cell, or related to a non-serving cell. The latter can be the case when random access is used to get established in a target cell during handover.

The UE monitors PDCCH of the cell for random access response in the RA response window, which starts at the subframe that contains the end of the preamble transmission plus three subframes and has the length ra-ResponseWindowSize.

If no response has been received, and the max number of preamble transmissions has been reached, or the timer T304 has expired, the handover attempt is considered failed and higher layer is informed. Then, the UE initiates the RRC connection reestablishment procedure to restore the connection to the source cell, specifying the reestablishment cause to handover failure. Furthermore, a radio link failure report is prepared.

Figure 26:
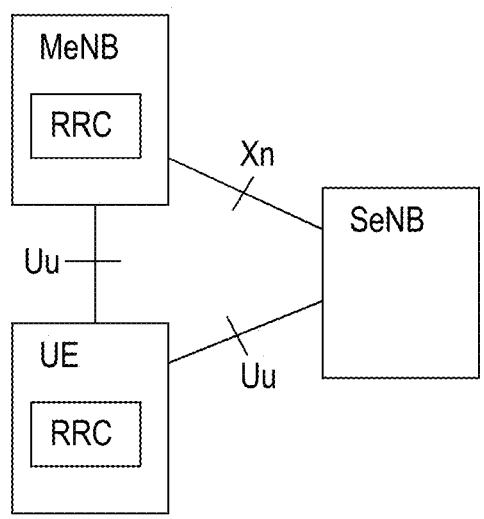
FIG. 26 is a schematic diagram illustrating control plane termination for dual connectivity, according to some embodiments.

There are currently different options for control plane termination for dual connectivity. The option considered here is where the UE has one single RRC entity, which communicates with a single RRC entity located in the MeNB on the network side. This is shown in FIG. 26. In this scenario, all control signalling between the UE and the network terminates in the MeNB. Only the MeNB generates the final RRC messages to be sent towards the UE after coordination of RRM functions between MeNB and SeNB. The UE RRC entity sees all messages coming only from one entity (in the MeNB) and the UE only replies back to that entity.

Note, that one option could foresee a "virtual RRC" entity in the SeNB that generates parts of the RRC message to be finally sent to the UE by the MeNB. This scheme is similar to the case of handover, HO, where the target eNB generates the RRC message to be sent to the UE by the source eNB. The difference between the dual-connectivity situation scenario presented here and HO is that in the former scenario the MeNB may need to check the contents of the partial RRC message and assemble the final RRC message.

In the following, it can be assumed that each node controls its own radio resources. This is necessary, since an eNB acting as SeNB towards one UE may at the same time act as MeNB towards another UE. In other words, MeNB and SeNB are UE-specific roles of an eNB. Thus, to ensure efficient usage of radio resources, each eNB must be in control of its own radio resources and a distributed RRM needs to be assumed.

There is a need for a procedure between the MeNB and the SeNB to agree on the UE radio resource configuration. For instance, a procedure is needed to enable the setup, the modification or the handover of a UE bearer for which radio resources are provided by a radio network node (SeNB) that is different from the radio network node (MeNB) that hosts the RRC connection and the connection to the core network. In addition, there might be a need to modify the physical or MAC layer RRC configuration used in the SeNB.

One important thing to consider here are the UE capabilities. The UE capabilities indicate whether the UE supports some features (static), but also indicate what are the maximum amounts of certain radio resources that can be allocated (dynamically) to the UE (e.g. number of Robust Header Compression, ROHC, context sessions).

Figure 27:
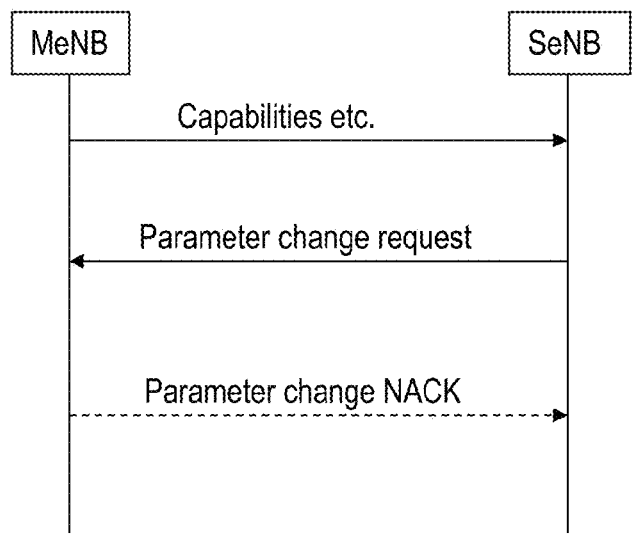
FIG. 27 is a signal flow diagram illustrating an example procedure for parameter negotiation between a master eNB and a secondary eNB.

The assumed procedure for negotiating radio resource configuration of the connection between the UE and the SeNB is shown in FIG. 27, and involves the following steps:
1. MeNB provides current radio resource configurations and capabilities of the UE for the SeNB over Xn. This may be done within the message that triggers the setup of resources within the SeNB.
2. The SeNB decides the radio resource configuration relevant for the SeNB and signals this to the MeNB over Xn. This may be done in response to the message triggering the setup of resources within the SeNB or during triggering the modification of already established resources.
3. The MeNB either accepts the radio resource configuration relevant for the SeNB, or rejects it and sends a NACK to the SeNB. If the parameter negotiation function was triggered during setup/HO of resources towards the SeNB, there might not be the need for an explicit ACK. In case of resource modification, if the radio resource configuration is accepted by the MeNB, it replies ACK back to the SeNB. If not, a NACK is sent.

The benefits of this solution are as follows:
the current model with signalling bearer 1 and signalling radio bearer 2 (SRB1/SRB2) which currently is used in LTE is sufficient,
It requires only one set of PDCP encryption keys for control plane,
One entity takes the final decision→no risk of exceeding capabilities, and
No need for parallel procedures for the UE (current model applies).

Dual connectivity may be defined from the UE perspective wherein the UE may simultaneously receive and transmit to at least two different network points. Dual connectivity is one of the features that are being standardised within the umbrella work of small cell enhancements within 3GPP LTE Rel-12.

Dual connectivity may be defined for the case when the aggregated network points operate on the same frequency or in separate frequencies. In Rel-12, the focus has been on supporting deployments on separate frequencies. Further in Rel-12, it is assumed that the UE is capable of simultaneously receiving and transmitting from two different nodes. Dual connectivity as a feature bears many similarities with carrier aggregation and Coordinated Multi Point, CoMP; the main differentiating factor is that dual connectivity is designed considering a relaxed backhaul and less stringent requirements on synchronisation between the network points. This is in contrast to carrier aggregation and CoMP, wherein, before Rel-12, tight synchronisation and a low-delay backhaul have been assumed between connected network points.

Figure 28:
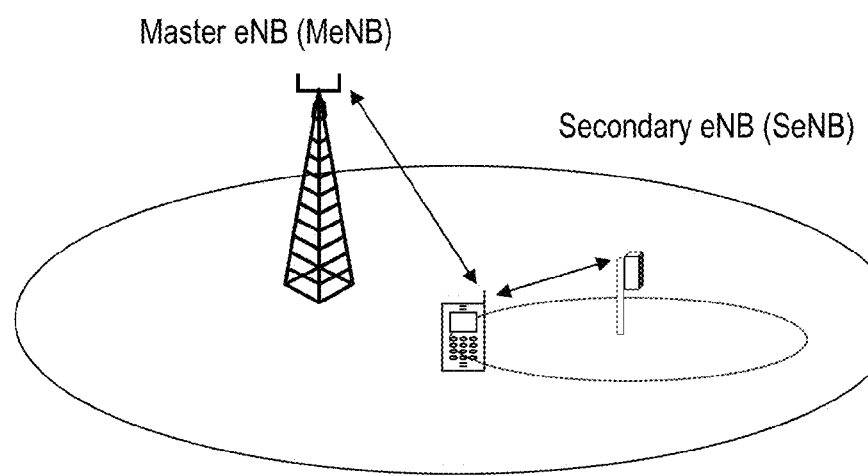
FIG. 28 illustrates an example of dual connectivity operation with the UE having multiple connections with both the MeNB and SeNB.

A UE in dual connectivity maintains simultaneous connections to MeNB and SeNB nodes as illustrated in FIG. 28.

As the name indicates, the MeNB terminates the control plane connection towards the UE and is thus the controlling node of the UE. In addition to the MeNB, the UE may be connected to one or several SeNBs for added user plane support. In Rel-12, the number of SeNBs is limited to one however more SeNBs may be supported in future releases.

The MeNB and SeNB roles are defined from a UE point of view. This means that an eNB that acts as a MeNB to one UE may act as SeNB to another UE.

FIG. 29 illustrates three options for splitting the U-Plane data. The main differentiating factors between the three options lies in the backhaul usage and the support for data split within or between EPS bearers. (1) Option 1: S1-U terminates in SeNB. (2) Option 2: S1-U always terminates in MeNB, no bearer split in RAN. (3) Option 3: S1-U always terminates in MeNB, bearer split in RAN.

Considering these three options, it is unclear whether one single option will suit all aspects. Given a non-ideal backhaul with limited capacity, option 1 is most appropriate since it avoids the routing of user plane data via the MeNB, creating possible bottlenecks. With option 1, improved mobility robustness by separating control and user plane termination can be achieved but implies signalling towards the CN for the path switch. This can be used to maintain a robust control plane connection with the macro layer, while offloading user plane traffic to the pico layer for improved throughput.

Furthermore, option 1 also allows user plane aggregation. Multi-path TCP, MPTCP, can be used to split the data between the two EPS bearers. The main principle of MPTCP is to aggregate a certain TCP connection over multiple paths. MPTCP has one main flow and multiple sub flows and is capable of distributing load on all interfaces. MPTCP is currently under standardisation process within Internet Engineering Task Force, IETF. As the multiplexing of different connections is on TCP level, it allows separate congestion control for each sub flow, overcoming the bottleneck problem of the first option discussed above. Though aggregation via MPTCP is applicable only for TCP based traffic, this will not be a big disadvantage as the majority of Internet/mobile broadband data is TCP based. MPTCP can also be implemented in a MPTCP proxy, so it doesn't need to be End-to-End, E2E. For small object sizes, MPTCP can give gain from parallel slow start phases. Further study is needed to evaluate the performance of option 1 and MPTCP.

However, in deployments where backhaul capacity is not an issue, option 3 may provide higher expected user resource aggregation gains through intra bearer user plane aggregation as the splitting point is closer to the radio interface, compared with option 1. However, it requires L2 to cater for splitting, flow control and reordering. Option 2 is similar to option 3, but would miss the opportunities for user plane aggregation gains, although it assumes high backhaul capacity. Considering the aforementioned and other aspects, options 1 and 3 are currently within the scope of the Rel-12 work item.

For bearer split option 1, the user plane protocol termination 1A is shown in FIG. 30. For bearer split option 3, several protocol termination options can be envisioned, depending on where in the protocol stack the data is split. For Rel-12, a protocol split shown in FIG. 31 was selected, referred to as 3C.

The selected user plane architecture options 1A and 3C should preferably not result in different specifications, but should rather be a configuration option. Therefore, it was proposed to have a common architecture with 3 types of bearers rather than two different architectures. In FIG. 32, the common architecture for user plane architectures 1A and 3C is drawn, illustrating three bearer types and their termination points. In the common architecture, there are three types of bearers:

A bearer only served by MeNB, referred to as Master Cell Group, MCG, Data Radio Bearer, DRB, i.e. a DRB for which resources are provided by the Master Cell Group.

A bearer only served by SeNB, referred to as Secondary Cell Group (SCG DRB), i.e. a DRB for which resources are provided by the Secondary Cell Group.

A bearer served by MeNB and SeNB, referred to as split DRB.

Both contention-free and contention-based RA procedures are supported towards the SeNB. Parallel RA procedures are supported if RA Preamble transmissions do not overlap, no requirement to coordinate Physical Random Access Channel, PRACH, resource in network side.

If a bearer is mapped into either MeNB or SeNB resources, the UE sends Buffer Status Report, BSR, information for that bearer to the eNB which owns that bearer.

Working assumption is to have separate Discontinuous Reception, DRX, configurations and operations (timers and active time).

Activation and deactivation are supported for SCG. MeNB can activate and deactivate Cells associated with MeNB. SeNB can activate and deactivate cells associated with SeNB.

It is agreed to have two MAC entities in the UE side in dual connectivity operation: UE side MAC entity is configured per Cell Group, i.e. one MAC for MCG and the other MAC for SCG.

The control plane architecture is designed along the following principles:
  each eNB is able to handle UEs autonomously, i.e., provide the Primary Cell, PCell, to some UEs while acting as SeNB for other;
  there will be only one S1-MME Connection per UE;
  each eNB involved in dual connectivity (DC) owns its radio resources, however some coordination is still needed between MeNB and SeNB;
  a UE always stays in a single RRC state, i.e. either RRC_CONNECTED or RRC_IDLE.

FIG. 33 illustrates the control plane architecture. The MeNB generates the final dedicated RRC messages to be sent towards the UE after the coordination of RRM functions between MeNB and SeNB. The UE RRC entity sees all messages as coming only from one entity (in the MeNB) and the UE only replies back to that entity.

In Release-12, L2 protocol termination for the control plane is made in MeNB, see FIG. 34. No further enhancements to the L2 protocols are required with this approach.

Broadcast information may carry both NAS and AS related information. For NAS related information, MeNB information is relevant for UEs in dual connectivity because the anchor eNB holds the S1-MME connection towards the CN. Each involved cell is considered for AS related information.

RAN2 assumes that the eNBs that support dual connectivity are capable of stand-alone operation. This means that the eNBs can be capable of broadcasting system information. However, this is not necessarily the case in all deployments. For acquisition of SeNB's System Information in dual connectivity, at least three alternatives exist:
  1. The UE receives System Information of the cells in the SeNB with dedicated RRC signalling from the MeNB;
  2. The UE reads all System Information broadcasted from the cells of the SeNB; or
  3. The UE reads SI of one cell (PCell-like) in the SeNB broadcast information and the rest of the System Information it receives through dedicated signalling.

The first alternative is similar to Carrier Aggregation where the UE needs to monitor System Information of only one cell (PCell) and relevant System Information of the rest of the cells arrives through dedicated RRC signalling. In this approach, the SeNB does not need to necessarily broadcast any System Information. This is useful for cell on/off operation where the network may want to go to sleep to save energy.

The second alternative can reduce the amount of dedicated signalling but requires the SeNB to always broadcast System Information for all its cells. This alternative increases the complexity of the UE because the UE needs to monitor SI of many cells and also monitor paging indications for the System Information changes. In addition, some of the RRC parameters may be UE specific. Thus, the UE may need additional rules to know which of the SI parameters are relevant for it so that there is no mismatch between the configuration provided by the MeNB and the SeNB.

The second solution may provide smoother System Information changes because the SeNB can fully control when System Information parameters change as modification periods are applied. Also, signalling overhead due to changed SI parameters is reduced. Considering handover, with this alternative, it would be possible to provide System Information parameters via dedicated RRC signalling in the addition of the SeNB similar to current handover procedure where the SI parameters of the target eNB are provided in the handover command. Thus there would not be additional delay during the SeNB addition.

Finally, the third alternative is a mix of the previous alternatives. It can also be considered as a relevant alternative as we can assume that there is one PCell-like cell in the network. If there is a need to change System Information of this cell, then this alternative would provide smooth system information changes. However, this solution would bring some additional standardization complexity as both alternatives would be supported.

Figure 35:
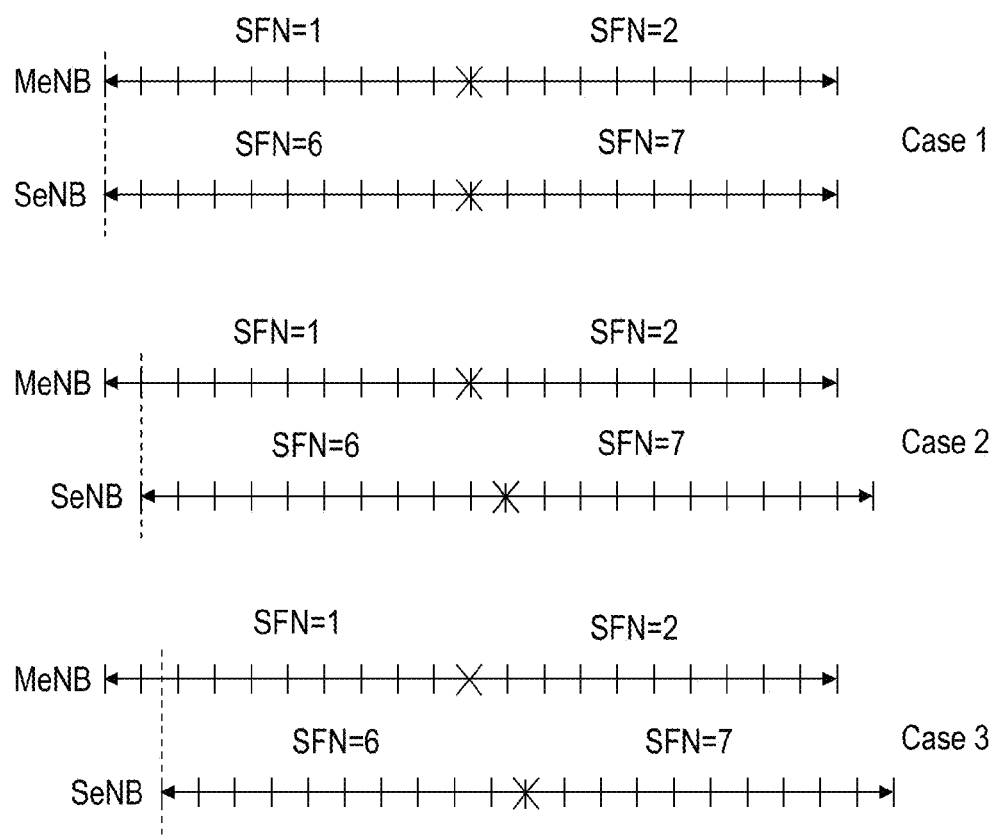
FIG. 35 illustrates different examples of SFN offsets.

FIG. 35 illustrates different examples of SFN offsets. Embodiments disclosed herein may overcome problems related to propagation of the SFN in Dual Connectivity wireless networks. SFN may be signalled by dedicated RRC signalling similar to any other common radio resource parameters. However, the RRC layer of the eNB cannot finely control when the UE will receive the RRC message, including SFN. Furthermore, if the RRC signalling for the SeNB's SFN is transmitted by the MeNB, then the synchronisation is more complex.

One approach is to signal SFN offset, where the SFN value of one cell is derived from an SFN of another cell utilizing an offset. Dual Connectivity is different than feICIC, where the eNBs are assumed to be frame aligned.

According to one embodiment, a method for determining offset in Dual Connectivity is as follows:
1. MeNB and SeNB coordinate to determine the SFN difference between them. The difference may be obtained by signalling over X2 or by reading the broadcasted information directly. In the X2 signalling approach, if the backhaul delay is not known, the SFN offset may be obtained by utilizing some other time reference, such as GPS time. Alternatively, SeNB may read the broadcast channel of the MeNB and obtain the MIB, including MeNB's SFN (or vice versa). Alternatively, SeNB may instruct a UE to signal the SFN of the MeNB. Another alternative approach is that the MeNB determines accuracy of the offset from a central network node, which signals the offset over S1 or X2. The offset may be a similar to an offset that is used to perform synchronization over the air between different cells on the SeNB frequency layer.
2. If SeNB determines the SFN offset, then it signals the offset to the MeNB over X2.
3. MeNB signals the SFN offset with RRC signalling to the UE.
4. When the UE receives the SFN offset from the MeNB, it determines the SFN of the SeNB.

In particular embodiments, the details of step 4 are as follows: The UE needs to know the SFN of the MeNB (SFN_MeNB), the SFN offset (SFN_offset), and starting time of radio frames in the MeNB (t_1) and SeNB (t_2). Times t_1 and t_2 are selected in such way that t_2>t_1. The timing difference between the frames is denoted by frame_offset=t_2−t_1. If time difference between current moment t and next radio frame boundary of the SeNB is bigger than variable frame_offset, then SFN_SeNB=SFN_MeNB+SFN_offset.

If time difference between current moment t and the next radio frame boundary of the SeNB is smaller than variable frame_offset, then SFN_SeNB=SFN_MeNB+SFN_offset−1.

FIG. 35 illustrates an example of SFN signaling offsets, according to some embodiments. In the following examples, the signaled offset is 5.

In Example 1 (illustrated as Case 1), frames are aligned and thus frame_offset=0. SFN_SeNB=SFN_MeNB+5.

In Example 2 (illustrated as Case 2), frames are not aligned but subframes are aligned. The frame_offset=t_2−t_1=1 ms. If in the current time moment, time to the next radio frame boundary of SeNB is bigger than 1 ms, the SFN_SeNB=SFN_MeNB+5. This is true in subframes 0,1, 2,3,4,5,6,7, and 8. If in the current time moment, time to the next radio frame boundary of the SeNB is smaller than 1 ms, the SFN_SeNB=SFN_MeNB+4. That occurs in subframe 9.

In Example 3 (illustrated as Case 3), uses similar calculations as in Example 2 even though subframes are not aligned. The frame_offset=t_2−t_1=1.5 ms. If in the current time moment (in the beginning of subframe), time to the next radio frame boundary of the SeNB is bigger than 1.5 ms, the SFN_SeNB=SFN_MeNB+5. This is true in subframes 0,1,2,3,4,5,6,7, and 8. If in the current time moment, time to the next radio frame boundary is smaller than 1 ms, the SFN_SeNB=SFN_MeNB+4. That occurs in subframe 9.

Other embodiments provide alternatives to using the offset in RRC layer, such as signalling the offset (or SFN of the SeNB) in lower layer protocols. This can be done directly by the SeNB, where lower layer protocols are also maintained. When the offset is signalled, SFN of the SeNB is derived similar to the method described above. If the SFN is signalled, then it can be used directly. The following description is an example where the SFN is signalled, but it also applies for the offset scenario.

Signalling for SFN may be MAC layer signalling, L1 signalling, or any other suitable signalling protocol. In the MAC layer example, the SeNB sends a MAC Control Element to the UE including the SFN towards the MeNB. The MAC control element is signalled to the UE when it is time to update the synchronization information in the UE. This may be done periodically by including the MAC CE in the PDSCH addressed to the UE. Alternatively, the SeNB provides the SFN when the UE accesses the SeNB and performs Random Access procedure to obtain UL synchronization. The MAC CE for SFN may be signalled during random access in Random Access Response MAC PDU (Msg2) or Contention Resolution message (Msg4).

When the UE receives a MAC CE, it may assume that the SFN signalled in that element refers to the subframe where the corresponding physical layer transmission was received. For example, if PDSCH reception is made in subframe 0, but the MAC CE is decoded later in subframe 4, the UE assumes that the SFN value signalled in the MAC CE was valid in subframe 0. Further, to avoid impacts of HARQ retransmissions, it may be assumed that this MAC CE can be carried only in initial transmissions.

Alternatively, the L1 signalling protocol may be used. The L1 signalling example refers to a DCI format that is signalled on the PDCCH that can be used to signal SFN. For example, special bits in a DCI formation can be used to indicate SFN. An example is that DCI format 1C or DCI format 1A is used for signalling the SFN, wherein a field in the DCI format indicates the SFN. Because SFN is common for all UEs, SFN can be included in the PDCCH addressed to a special RNTI (SFN RNTI) that is known by all UEs.

For embodiments with dedicated signalling approaches, different eNBs get unsynchronized due to clock drift and thus the SFN is no longer valid. This may be solved by updating the SFN_offset by the network. If the SFN_offset is correct, then the SFN_SeNB is correct because it is calculated based on the SFN of MeNB that is achieved from a broadcasted channel.

For the example where the SFN_offset or SFN information is included in the MAC Control element in the random access procedure, the SeNB or the MeNB may determine that the SFN needs to be updated in a specific UE served by SeNB. In such a situation, the SeNB or the MeNB will instruct that UE to perform a random access to the SeNB. By instructing the UE to perform a random access, the UE is able to update the SFN of the SeNB. The SeNB and MeNB may, for example, judge whether the SFN for the SeNB needs to be updated in the UE based on one of the following approaches:

the UE has been connected for a certain time towards the SeNB.

Comparing the SeNB and MeNB SFN together with comparing this toward the SFN_offset or the SFN of the SeNB that the UE assumes.

Figure 36:
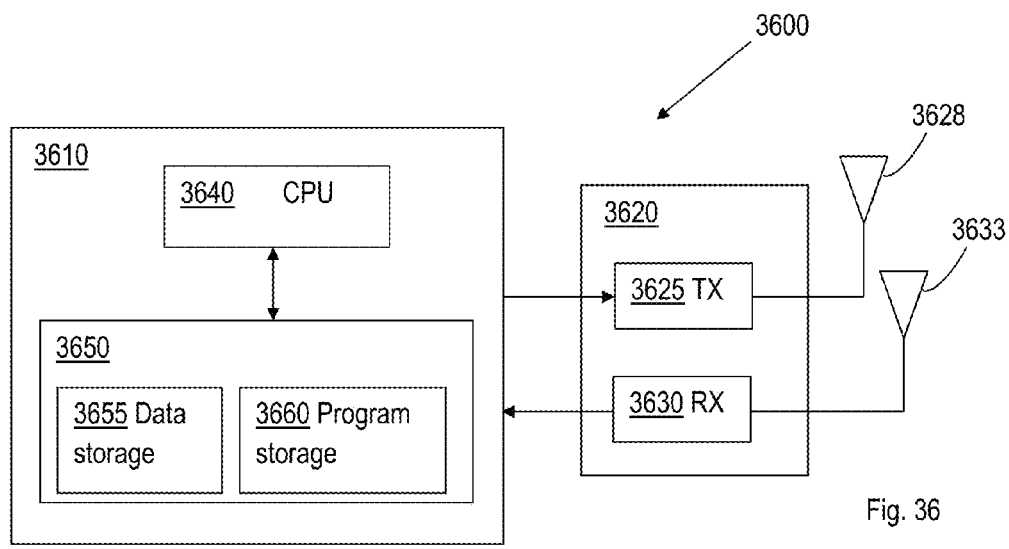
FIG. 36 is a block diagram generally illustrating a wireless terminal or device, e.g. a network node, wireless device, UE, SeNB, MeNB.

FIG. 36 illustrates features of an example terminal 3100 according to several embodiments of the above described methods and arrangements, such as the UE, the MeNB and the SeNB. Terminal 3600, which may be a UE configured for dual-connectivity operation with an LTE network (E-UTRAN), for example, comprises a transceiver unit 3620 for communicating with one or more base stations as well as a processing circuit 3610 for processing the signals transmitted and received by the transceiver unit 3620. Transceiver unit 3620 includes a transmitter 3625 coupled to one or more transmit antennas 3628 and receiver 3630 coupled to one or more receiver antennas 3633. The same antenna(s) 3628 and 3633 may be used for both transmission and reception. Receiver 3630 and transmitter 3625 may use known radio processing and signal processing components and techniques, typically according to a particular telecommunications standard such as the 3$^{rd}$ Generation Partnership Project, 3GPP, standards for LTE. Note also that transmitter unit 3620 may comprise separate radio and/or baseband circuitry for each of two or more different types of radio access network, such as radio/baseband circuitry adapted for E-UTRAN access and separate radio/baseband circuitry adapted for Wi-Fi access. The same applies to the antennas—while in some cases one or more antennas may be used for accessing multiple types of networks, in other cases one or more antennas may be specifically adapted to a particular radio access network or networks. Because the various details and engineering trade-offs associated with the design and implementation of such circuitry are well known and are unnecessary to a full understanding of the embodiments, additional details are not shown here.

Processing circuit 3610 comprises one or more processors 3640 coupled to one or more memory devices 3650 that make up a data storage memory 3655 and a program storage memory 3660. Processor 3640, identified as CPU 3640 in FIG. 36, may be a microprocessor, microcontroller, or digital signal processor, in some embodiments. More generally, processing circuit 3610 may comprise a processor/firmware combination, or specialised digital hardware, or a combination thereof. Memory 3650 may comprise one or several types of memory such as read-only memory (ROM), random-access memory, cache memory, flash memory devices, optical storage devices, etc. Because terminal 3600 supports multiple radio access networks, processing circuit 3610 may include separate processing resources dedicated to one or several radio access technologies, in some embodiments. Again, because the various details and engineering trade-offs associated with the design of baseband processing circuitry for mobile devices are well known and are unnecessary to a full understanding of the embodiments, additional details are not shown here.

Typical functions of the processing circuit 3610 include modulation and coding of transmitted signals and the demodulation and decoding of received signals. In several embodiments of the present invention, processing circuit 3610 is adapted, using suitable program code stored in program storage memory 3660, for example, to carry out one of the techniques described above for access network selection. Of course, it will be appreciated that not all of the steps of these techniques are necessarily performed in a single microprocessor or even in a single module.

Figure 37:
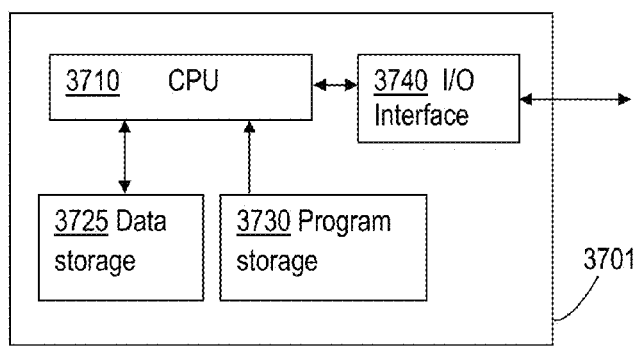
FIG. 37 is a block diagram generally illustrating a wireless terminal or device, e.g. a network node, wireless device, UE, SeNB, MeNB.

Similarly, several of the techniques and processes described above can be implemented in a network node, such as an eNodeB or other node in a 3GPP network. FIG. 37 is a schematic illustration of a node 3701, e.g. a MeNB and/or a SeNB, in which a method embodying any of the presently described network-based techniques can be implemented. A computer program for controlling the node 3701 to carry out a method embodying the present embodiments is stored in a program storage 3730, which comprises one or several memory devices. Data used during the performance of a method embodying the present embodiments is stored in a data storage 3725, which may also comprise one or more memory devices. During performance of a method embodying the present embodiments, program steps are fetched from the program storage 3730 and executed by a Central Processing Unit (CPU) 3710, retrieving data as required from the data storage 3725. Output information resulting from performance of a method embodying the present embodiments can be stored back in the data storage 3725, or sent to an Input/Output (I/O) interface 3740, which includes a network interface for sending and receiving data to and from other network nodes and which may also include a radio transceiver for communicating with one or more terminals.

Accordingly, in various embodiments of the invention, processing circuits, such as the CPU 3710 and memory circuits 3725 and 3730 in FIG. 37, are configured to carry out one or more of the techniques described in detail above. Likewise, other embodiments may include radio network controllers including one or more such processing circuits. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

It will be appreciated by the person of skill in the art that various modifications may be made to the above described embodiments without departing from the scope of the present solution. For example, although embodiments have been described with examples that include a communication system compliant to the 3GPP specified LTE standard specification, it should be noted that the solutions presented may be equally well applicable to other networks that support dual connectivity. The specific embodiments described above should therefore be considered exemplary rather than limiting the scope of the invention. Because it is not possible, of course, to describe every conceivable combination of components or techniques, those skilled in the art will appreciate that the present embodiments can be implemented in other ways than those specifically set forth herein, without departing from essential characteristics of the embodiments. The present embodiments are thus to be considered in all respects as illustrative and not restrictive.

Although the preceding embodiments have been described for example purposes, it will be appreciated that other example embodiments include variations of and extensions to these enumerated examples, in accordance with the detailed procedures and variants described above. In the above-description, the terminology used is for the purpose of describing particular embodiments only and is not intended to be limiting. Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of this specification and the relevant art and will not be interpreted in an idealised or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present disclosure. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, some embodiments may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of the disclosure. Moreover, although some of the diagrams include arrows on communication paths to show a primary direction of communication, it is to be understood that communication may occur in the opposite direction to the depicted arrows.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a User Equipment (UE) operable in a wireless communication system, the wireless communication system being adapted to provide for dual connectivity between the UE and a Master evolved Node B (MeNB), and between the UE and a Secondary eNB (SeNB), the method being performed for acquiring system information of the wireless communication system, the method comprising:

receiving, from the MeNB, a System Frame Number (SFN) of the MeNB from a Master Information Block (MIB); and receiving, from the MeNB, an SFN offset relating to the offset between the SFN of the SeNB and the SFN of the MeNB by means of dedicated Radio Resource Control (RRC) signalling;

wherein a starting time of radio frames in the MeNB is denoted t1 and a starting time of radio frames in the SeNB is denoted t2, wherein t2>t1 and a frame_offset is defined as t2−t1, and wherein:

when a time difference between a current moment t, and the next radio frame boundary of the SeNB is bigger than the frame_offset, then the SFN of the SeNB is defined as the SFN of the MeNB+the SFN offset; and when the time difference between the current moment t and the next radio frame boundary of the SeNB is smaller than the frame_offset, then the SFN of the SeNB is defined as the SFN of the MeNB+the SFN offset−1.

2. The method according to claim 1, further comprising determining the SFN of the SeNB based on the SFN of the MeNB and the SFN offset.

3. The method according to claim 1, further comprising:
receiving, from the SeNB, a request to acquire the SFN of the MeNB from the MIB; and
transmitting the SFN of the MeNB to the SeNB.

4. A User Equipment (UE) operable in a wireless communication system, the wireless communication system being adapted to provide for dual connectivity between the UE and a Master evolved Node B (MeNB), and between the UE and a Secondary eNB (SeNB), the UE being configured to acquire system information of the wireless communication system, the UE comprising a processing circuit configured to:

receive, from the MeNB, a System Frame Number (SFN) of the MeNB from the Master Information Block (MIB); and receive, from the MeNB, an SFN offset relating to the offset between the SFN of the SeNB and the SFN of the MeNB by means of dedicated Radio Resource Control (RRC) signalling;

wherein a starting time of radio frames in the MeNB is denoted t1 and a starting time of radio frames in the SeNB is denoted t2, wherein t2>t1 and a frame_offset is defined as t2−t1, wherein:

when a time difference between a current moment t and the next radio frame boundary of the SeNB is bigger than the frame_offset, then the SFN of the SeNB is defined as the SFN of the MeNB+the SFN offset; and when the time difference between the current moment t and the next radio frame boundary of the SeNB is smaller than the frame_offset, then the SFN of the SeNB is defined as the SFN of the MeNB+the SFN offset−1.

5. The UE according to claim 4, wherein the processing circuit is configured to determine the SFN of the SeNB based on the SFN of the MeNB and the SFN offset.

6. The UE according to claim 4, wherein the processing circuit is configured to:
receive, from the SeNB, a request to acquire the SFN of the MeNB from the MIB; and
transmit the SFN of the MeNB to the SeNB.

* * * * *